United States Patent
Park et al.

(10) Patent No.: US 10,285,152 B2
(45) Date of Patent: May 7, 2019

(54) APPARATUS AND METHOD FOR MEASURING POSITIONS OF DEVICES

(71) Applicant: Samsung Electronics Co., Ltd, Gyeonggi-do (KR)

(72) Inventors: Seong-Hee Park, Seoul (KR); Heesu Kim, Seoul (KR); Kwanghoon Han, Gyeonggi-do (KR); Myounghwan Lee, Gyeonggi-do (KR); Sungmin Jo, Gyeonggi-do (KR); Chilyoul Yang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/348,936

(22) Filed: Nov. 10, 2016

(65) Prior Publication Data
US 2017/0135061 A1    May 11, 2017

(30) Foreign Application Priority Data
Nov. 10, 2015    (KR) .................. 10-2015-0157529

(51) Int. Cl.
| | |
|---|---|
| *H04W 64/00* | (2009.01) |
| *H04W 4/02* | (2018.01) |
| *H04W 24/10* | (2009.01) |
| *G01S 5/02* | (2010.01) |
| *G01S 11/16* | (2006.01) |

(52) U.S. Cl.
CPC .......... *H04W 64/00* (2013.01); *G01S 5/0289* (2013.01); *G01S 11/16* (2013.01); *H04W 4/02* (2013.01); *H04W 24/10* (2013.01); *H04W 64/006* (2013.01)

(58) Field of Classification Search
CPC ...................................................... H04W 64/00
See application file for complete search history.

(56) References Cited

U.S. PATENT DOCUMENTS

| | | |
|---|---|---|
| 6,680,688 B1 | 1/2004 | Jiang et al. |
| 7,382,271 B2 | 6/2008 | Mcfarland |
| 2007/0133598 A1 | 6/2007 | Moran |
| 2008/0208470 A1* | 8/2008 | Shih ................. G01S 19/05 |
| | | 701/300 |

(Continued)

FOREIGN PATENT DOCUMENTS

WO    2014095521 A1    6/2014

OTHER PUBLICATIONS

The International Searching Authority, "International Search Report," Application No. PCT/KR2016/012891, dated Dec. 22, 2016, 3 pages, publisher the ISA/KR, International Application Division, Korean Intellectual Property Office, Daejeon, Republic of Korea.

(Continued)

*Primary Examiner* — Mazda Sabouri

(57) ABSTRACT

A technique for sensor network, Machine to Machine (M2M), Machine Type Communication (MTC), and Internet of Things (IoT) is provided. A method for operating an electronic device according to an embodiment of the present disclosure includes receiving data for distance measurement between devices, wherein the electronic device is a first device among the devices, and determining positions of the devices using distances between the devices determined based on the data.

20 Claims, 32 Drawing Sheets

(56) References Cited

U.S. PATENT DOCUMENTS

| | | | |
|---|---|---|---|
| 2009/0213003 A1 | 8/2009 | Tsai et al. | |
| 2010/0105409 A1* | 4/2010 | Agarwal | G01S 5/0263 |
| | | | 455/456.1 |
| 2014/0105054 A1* | 4/2014 | Saegrov | H01Q 3/2605 |
| | | | 370/252 |
| 2014/0152437 A1* | 6/2014 | Tian | G01S 5/02 |
| | | | 340/539.14 |
| 2015/0072674 A1 | 3/2015 | Shoemaker et al. | |
| 2015/0124735 A1* | 5/2015 | Cho | H04W 72/042 |
| | | | 370/329 |
| 2015/0346319 A1 | 12/2015 | Wuersch et al. | |

OTHER PUBLICATIONS

The International Searching Authority, "Written Opinion," Application No. PCT/KR2016/012891, dated Dec. 22, 2016, 6 pages, publisher the ISA/KR, International Application Division, Korean Intellectual Property Office, Daejeon, Republic of Korea.

Supplementary European Search Report dated May 18, 2018 in connection with European Patent Application No. EP 16 86 4564.

\* cited by examiner

APPARATUS AND METHOD FOR MEASURING POSITIONS OF DEVICES

CROSS-REFERENCE TO RELATED APPLICATION(S) AND CLAIM OF PRIORITY

The present application is related to and claims the benefit under 35 U.S.C. § 119(a) to a Korean patent application filed in the Korean Intellectual Property Office on Nov. 10, 2015, and assigned Serial No. 10-2015-0157529, the entire disclosure of which is hereby incorporated by reference.

TECHNICAL FIELD

The present disclosure relates generally to position measurement of devices in an electronic device.

BACKGROUND

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In recent, as wireless communication technologies advance, various services using a communication function of an electronic device are developed and researched. Users can send and receive signals through the electronic device such as a smart phone, which enables wireless connection, send and receive various data (e.g., multimedia data such as videos, music, photos, or documents), and thus receive diverse services.

SUMMARY

To address the above-discussed deficiencies, it is a primary object to provide an apparatus and a method operated by an electronic device for measuring a position of another electronic device.

Various embodiments of the present disclosure provide an apparatus and a method operated by an electronic device for measuring relative positions of other devices.

Various embodiments of the present disclosure provide an apparatus and a method operated by an electronic device for determining a topology of positions of other devices.

Various embodiments of the present disclosure provide an apparatus and a method operated by an electronic device for measuring relative positions of devices using sound signals.

Various embodiments of the present disclosure provide an apparatus and a method for transferring a positioning function from an electronic device to another electronic device.

According to an embodiment of the present disclosure, a method for operating an electronic device includes receiving data for distance measurement between devices, and determining positions of the devices using distances between the devices determined based on the data.

According to another embodiment of the present disclosure, a method for operating an electronic device includes generating data for distance measurement between devices, and transmitting the distance measurement data between the devices to another device, wherein the data is used by the other device to determine distances between the devices, and the distances are used by the other device to determine positions of the devices.

According to an embodiment of the present disclosure, an electronic device includes a receiving unit for receiving data for distance measurement between devices, and a control unit for determining positions of the devices using distances between the devices determined based on the data.

According to another embodiment of the present disclosure, an electronic device includes a control unit for generating data for distance measurement between devices, and a transmitting unit for transmitting the distance measurement data between the devices to another device, wherein the data is used by the other device to determine distances between the devices, and the distances are used by the other device to determine positions of the devices.

Various other embodiments, aspects, advantages, and salient features of the disclosure will become apparent to those skilled in the art from the following detailed description, which, taken in conjunction with the annexed drawings, discloses exemplary embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

FIGS. 1 through 31, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Exemplary embodiments of the present disclosure provide techniques for an electronic device for measuring positions of devices.

Hereinafter, terms indicating device types, terms indicating signals, terms indicating control parameters, terms indicating messages, and terms indicating device components are described to ease the understanding. Accordingly, the present disclosure is not limited to those terms to be explained, and can adopt other terms having technically equivalent meanings.

To facilitate explanations, some of terms and names defined in a particular communication protocol (e.g., Bluetooth®) can be used. However, the present disclosure is not limited to such terms and names, and can be equally applied to systems conforming to other standards.

For example, an electronic device to be described can be a portable electronic device having a wireless connection function such as a smart phone. For example, a wireless device can include one of a portable terminal, a mobile phone, a mobile pad, a tablet computer, a handheld computer, and a Personal Digital Assistant (PDA). For example, the wireless device can include one of a media player, a camera, a speaker, and a media device such as a smart television, which enables wireless connection. For example, the electronic device can be a wearable electronic device such as a smart watch and a smart glass. For example, the electronic device can be a Point Of Sales (POS) device or a beacon device. For example, the electronic device can combine two or more functions of those devices. Hence, in some cases, the electronic device may be referred to as a user mobile phone, a speaker, a TV, a user computer, a POS device, a beacon device, or a smart watch.

According to various embodiments of the present disclosure, communication between electronic devices can be performed based on a direct communication network or a wireless Local Area Network (LAN) network, which supports the wireless connection between devices, such as Bluetooth® and Wireless Fidelity (Wi-Fi).

Figure 1:
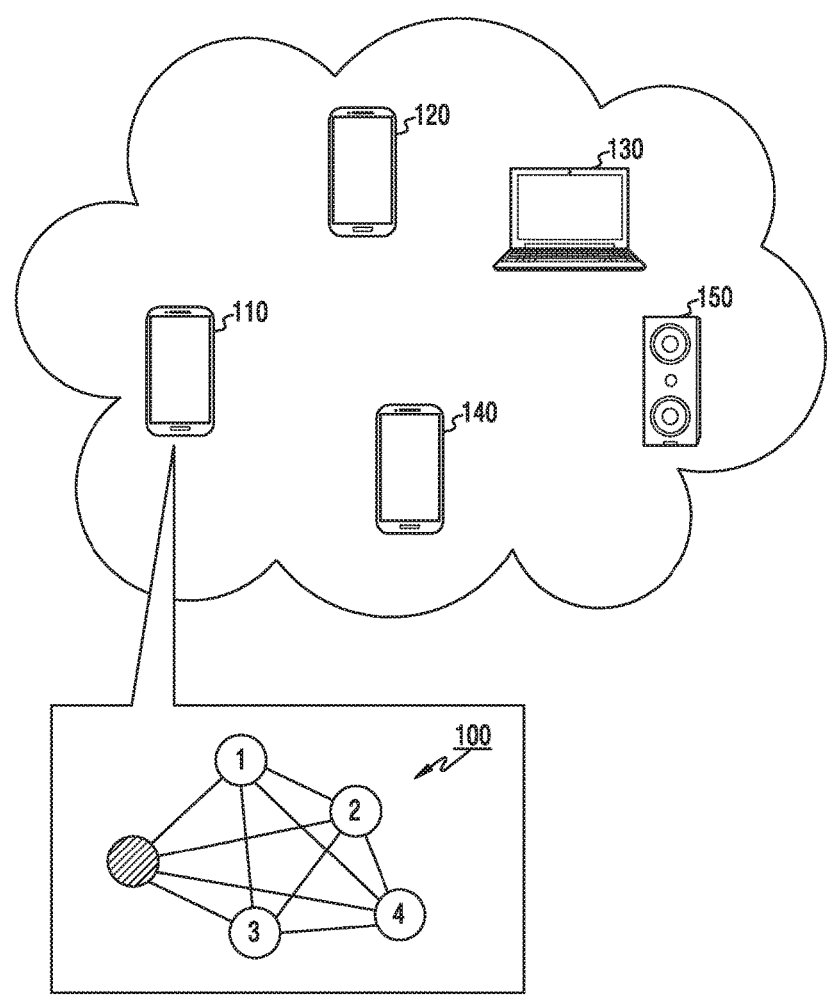
FIG. 1 illustrates an electronic device according to an embodiment of the present disclosure.

FIG. 1 depicts position measurement results according to an embodiment of the present disclosure. Referring to FIG. 1, a first device 110 and devices 120 through 150 are in a certain range. The first device 110 can measure relative positions 100 of the devices 120 through 150, that is, relative position relations 100 between the first device 100 and the devices 120 through 150. The relative position relations 100 include relative direction and distance information of other devices based on one device of a device set. Although absolute direction and coordinate information is further included, it is obvious that it is included in the relative position relations 100 according to an embodiment. The relative position relations can be referred to as a topology.

Figure 2:
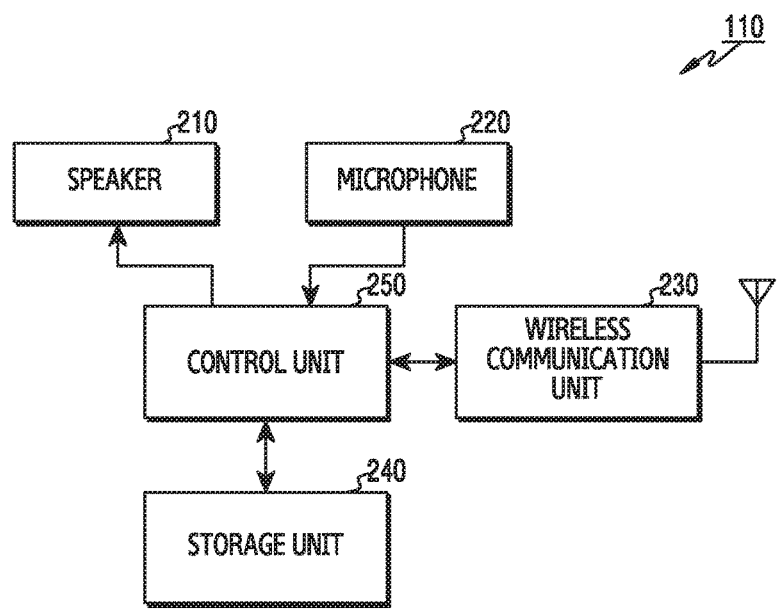
FIG. 2 illustrates a block diagram of an electronic device according to an embodiment of the present disclosure.

FIG. 2 is a block diagram of an electronic device according to an embodiment of the present disclosure. Hereafter, terms such as "units" and "parts" indicate units for processing at least one function or operation, and can be implemented using hardware or software alone or in combination.

Referring to FIG. 2, the electronic device includes a speaker 210, a microphone 220, a wireless communication unit 230, a storage unit 240, and a control unit 250.

The speaker 210 converts an electric signal to a sound wave. The microphone 220 converts a received sound wave to an electric signal. The speaker 210 can radiate a sound signal for distance measurement, and the microphone 220 can detect sound signals from an electronic device and other device. Although not depicted in FIG. 2, the electronic device can further include a sound module for generating the sound signal to be radiated through the speaker 210 and processing the sound signal detected by the microphone 220.

The wireless communication unit 230 transmits and receives signals over a radio channel. For example, the wireless communication unit 230 converts a baseband signal to a bit string and vice versa according to a physical layer standard of a system. For example, in data transmission, the wireless communication unit 230 generates complex symbols by encoding and modulating a transmit bit string. In data reception, the wireless communication unit 230 restores the received bit string by demodulating and decoding the baseband signal. The wireless communication unit 230 up-converts the baseband signal to a Radio Frequency (RF) signal, transmits the RF signal over an antenna, and down-converts an RF signal received over the antenna to a baseband signal. For example, the wireless communication unit 230 can include a transmit filter, a receive filter, an amplifier, a mixer, an oscillator, a Digital to Analog Converter (DAC), and an Analog to Digital Converter (ADC). That is, the wireless communication unit 230 generates and transmits a radio signal to outside via the antenna, and process a radio signal received from the outside. According to an embodiment, the wireless communication unit 230 can transmit and receive low-power radio signals such as Bluetooth® signals.

The wireless communication unit 230 can include different communication modules for processing signals of different frequency bands. For example, different communication standards can include Bluetooth® Low Energy (BLE), Wi-Fi, WiFi Gigabyte (WiGig), and a cellular network (e.g., Long Term Evolution (LTE)). The different frequency bands can include a Super High Frequency (SHF) (e.g., 2.5 GHz, 5 GHz) band and a millimeter weave (e.g., 60 GHz) band.

As such, the wireless communication unit 230 can transmit and receive the signals. Hence, the wireless communication unit 230 can be referred to as a transmitter, a receiver, or a transceiver. Hereafter, the transmission and the reception over the radio channel include the above-stated processing of the wireless communication unit 230.

The storage unit 240 stores a basic program for the operations of the electronic device, an application program, and data such as setting data. The storage unit 240 can include a volatile memory, a non-volatile memory, or a combination of the volatile memory and the non-volatile memory. In particular, the storage unit 240 can store commands and setting information for positioning devices based on the distance measurement. The storage unit 240 provides the stored data according to a request of the control unit 250.

The control unit 250 controls the operations of the electronic device. For example, the control unit 250 can transmit and receive radio signals through the wireless communication unit 230. The control unit 250 can radiate a sound through the speaker 210 and process a sound detected by the microphone 220. The control unit 250 records and reads data to and from the storage unit 240. For doing so, the control unit 250 can include at least one processor or microprocessor, or can be a part of a processor. According to an embodiment of the present disclosure, the control unit 250 can measure distances between multiple devices and locate the devices based on the measured distances. For example, the control unit 250 can control to operate the electronic device according to various embodiments to be explained.

Although not depicted in FIG. 2, the electronic device can further include an input/output unit for interaction with a user. The input/output unit can include an input device and a display device (e.g., a touch screen), for an interface between the electronic device and the user.

Figure 3:
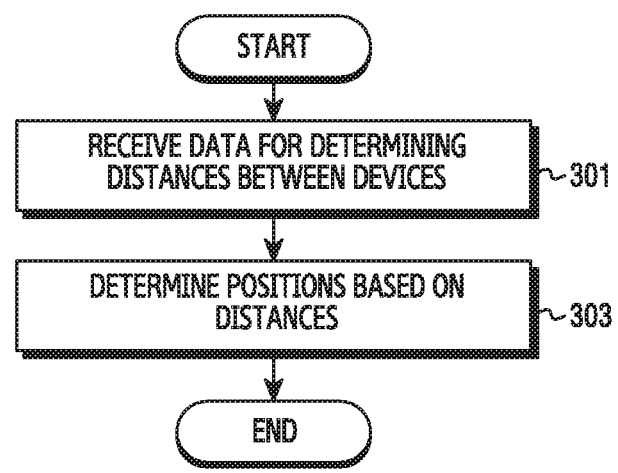
FIG. 3 illustrates an operating method of an electronic device according to an embodiment of the present disclosure.

FIG. 3 illustrates an operating method of an electronic device according to an embodiment of the present disclosure. FIG. 3 illustrates operations of a device (e.g., the first device 110) which initiates positioning of devices.

Referring to FIG. 3, the electronic device receives data to determine distances between devices in operation 301. The data can include measurement data for the distance determination, or distance information determined by the devices. For example, the measurement data includes at least one of an arrival time difference of a radio signal and a sound signal, an arrival time of the sound signal, and an arrival time of the radio signal.

In operation 303, the electronic device determines positions of the devices based on the distances. The electronic device determines relative position relations, that is, a topology of the devices based on the determined distance information. For example, the electronic device can determine coordinates of the minimum distance error sum, as each device position.

Although not depicted in FIG. 3, before receiving the data to determine the distances, the electronic device can transmit control information for the distance measurement. For example, the control information can include at least one of scheduling information (e.g., a transmit time, a sound signal pattern), the number of the devices participating in the distance measurement, and identification information of at least one device for the distance measurement.

Although not depicted in FIG. 3, after determining the positions, the electronic device can transmit the determined position information, that is, the topology information to the other devices. Hence, the topology information can be shared by the devices.

Figure 4:
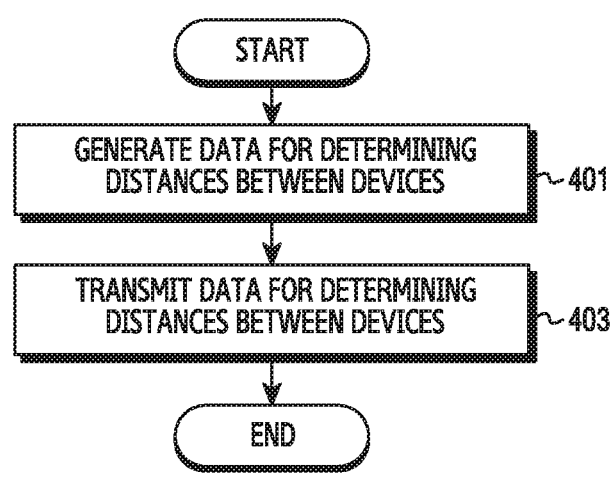
FIG. 4 illustrates an operating method of an electronic device according to other embodiments of the present disclosure.

FIG. 4 illustrates an operating method of an electronic device according to other embodiments of the present disclosure. FIG. 4 illustrates operations of a device (e.g., the second device 120) participating in positioning of devices.

Referring to FIG. 4, the electronic device generates data for determining distances between the devices in operation 401. The data is needed when determining distances from the electronic device to the other devices, and can include measurement data for the distance determination or distance information determined by the electronic device. For example, the measurement data includes at least one of an arrival time difference of a radio signal and a sound signal, an arrival time of the sound signal, and an arrival time of the radio signal.

In operation 403, the electronic device transmits the data for determining the distances. The electronic device transmits the data for determining the distances, to a device which initiates the positioning. Hence, the device which initiates the positioning can measure the distances between devices and determine their positions based on the distances.

Although not depicted in FIG. 4, before generating the data to determine the distances, the electronic device can receive control information for the distance measurement. For example, the control information can include at least one of scheduling information (e.g., a transmit time, a sound signal pattern), the number of the devices participating in the distance measurement, and identification information of at least one device for the distance measurement.

Although not depicted in FIG. 4, after sending the data for determining the positions, the electronic device can transmit the determined position information, that is, the topology information to the other devices. Hence, the topology information can be shared by the devices.

To determine the relative position relations, the distance information between the devices is required. That is, the relative position relation determination requires the distance measurement between a pair of devices. Hence, the present disclosure first provides a method for measuring a distance between two devices.

Figure 5:
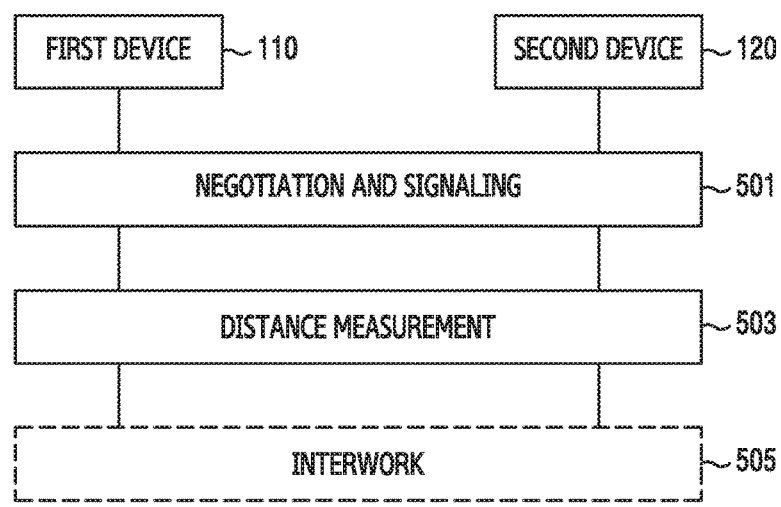
FIG. 5 illustrates distance measurement between devices according to an embodiment of the present disclosure.

FIG. 5 depicts a method for measuring a distance between devices according to an embodiment. In FIG. 5, a distance between two devices is measured.

Referring to FIG. 5, in operation 501, the first device 110 and the second device 120 perform negotiation and signaling for the distance measurement. Specifically, the negotiation and the signaling can include at least one of discovery, connection establishment, capability information exchange for the distance measurement, device characteristic information exchange, distance measurement method negotiation, and scheduling information exchange for signals to be used in the distance measurement, between the first device 110 and the second device 120.

In operation 503, the first device 110 and the second device 120 measure the distance. Specifically, at least one of the first device 110 and the second device 120 can send at least one signal for the distance measurement and calculate the distance based on data (e.g., receive time information) of the at least one signal. Herein, the at least one signal includes at least one of a radio signal and a sound signal. The radio signal can be referred to as an electromagnetic wave, and the sound signal can be referred to as a sound wave. The sound signal can be a signal within an audible frequency of a person, or have a frequency other than the audible frequency.

In operation 505, the first device 110 and the second device 120 operate together based on the distance measurement result. That is, the first device 110 and the second device 120 execute a corresponding application using the measured distance. The corresponding application can vary according to types and purposes of the first device 110 and the second device 120. It is noted that the operation 505 can be omitted.

Figure 6A:
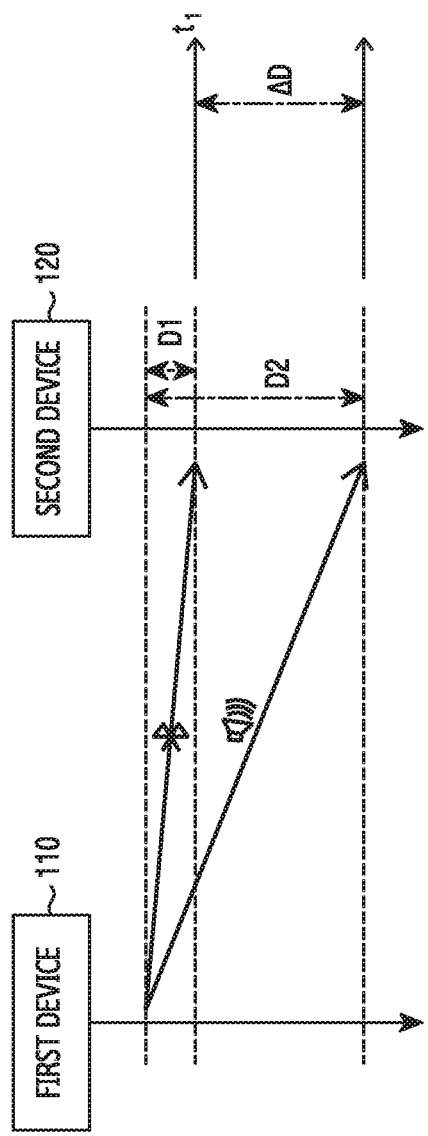
FIGS. 6A and 6B illustrate principles of distance measurement according to an embodiment of the present disclosure.
Figure 6B:
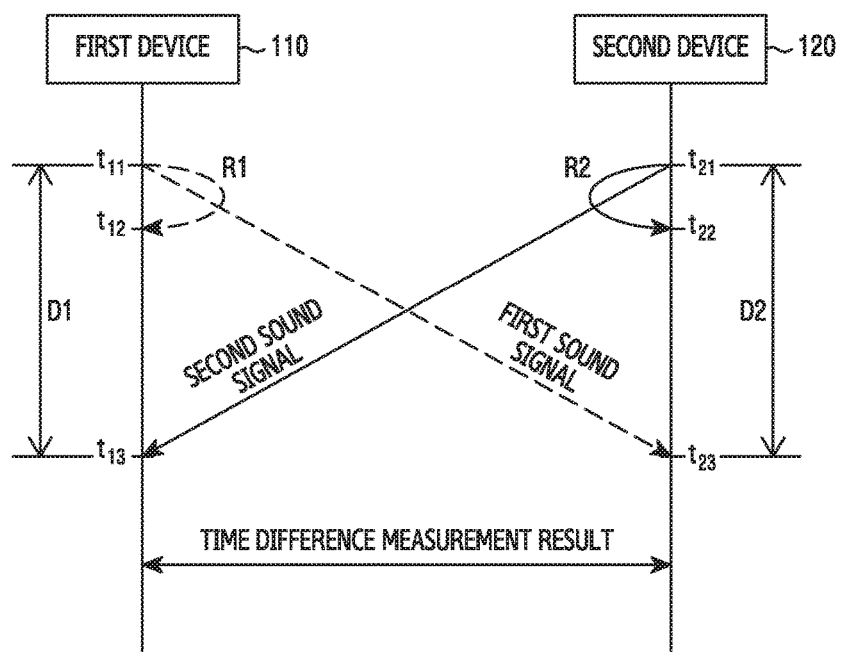

The distance can be measured as shown in FIG. 5. Detailed distance measurement can be performed as shown in FIG. 6A and FIG. 6B. FIGS. 6A and 6B illustrate principles of distance measurement according to an embodiment of the present disclosure. FIG. 6A depicts a method using both of a radio signal and a sound signal, and FIG. 6B depicts a method using only a sound signal.

Referring first to FIG. 6A, distances are measured using a sound signal and a radio signal. Propagation speeds of the sound signal and the radio signal in the air are different from each other. Accordingly, a sound signal and a radio signal simultaneously transmitted from the same signal source arrive at a particular destination at different times. That is, a propagation time D2 of the sound signal is longer than a propagation time D1 of the radio signal as shown in FIG. 6A. In so doing, as the distance between the signal source and the destination increases, a difference between the arrival time of the radio signal and the arrival time of the sound signal increases. Hence, based on the propagation time difference AD which is the difference of D1 and D2, the distance between the signal source and the destination can be measured. That is, the distance can be measured based on the speed difference of the radio signal and the sound signal and the arrival time difference of the sound signal and the radio signal. Thus, the first device 110 sends the radio signal and the sound signal to the second device 120, the second device 120 measures the arrival time difference of the sound signal and the radio signal, and thus the distance between the first device 110 and the second device 120 can be measured based on the arrival time difference. In so doing, the distance can be calculated by the second device 120, or by the first device 110 which receives measurement data (e.g., the arrival time difference) from the second device 120.

Referring to FIG. 6B, a distance is measured using a sound signal. Unlike FIG. 6A, both devices transmit a signal and receive a signal in the embodiment illustrated by FIG. 6B. The sound signal is transmitted through a speaker and received through a microphone. Hence, when the first device 110 receives its own first sound signal, certain time is taken due to a position difference of the speaker and the microphone. In FIG. 6B, the first device 110 receives the first sound signal transmitted at time $t_{11}$, at time $t_{12}$, and the second device 120 receives a second sound signal transmitted at time $t_{21}$, at time $t_{22}$. At this time, a time interval between the transmission and the reception of the first sound signal in the first device 110 is R1, and a time interval between the transmission and the reception of the second sound signal in the second device 120 is R2. Next, the first device 110 receives the second sound signal at time $t_{13}$, and the second device 120 receives the first sound signal at time $t_{23}$. Hence, the first device 110 can calculate a time difference D1 ($=t_{13}-t_{12}+R1$) between the first sound signal transmission and the second sound signal reception, and the second device 120 can calculate a time difference D2 ($=t_{23}-t_{22}+R2$) between the second sound signal transmission and the first sound signal reception. The first device 110 can determine the times $t_{12}$ and $t_{13}$ based on recording data of the first sound signal and the second signal, and determine R1 based on the distance between the speaker and the microphone. Alternatively, the first device 110 can directly measure $t_{11}$ and $t_{13}$.

Herein, a sum of D1 and D2 equals a Round Trip Time (RTT) of the sound signal between the first device 110 and the second signal 120. Typically, when one of the two devices sends a first signal and the other device receives the first signal and immediately sends a second signal, the RTT can be defined as a difference between the first signal transmission time and the second signal reception time measured at the one device. In FIG. 6B, since the second sound signal is not transmitted after the first sound signal is received, the time interval between $t_{11}$ and $t_{13}$ is different from the RTT. However, compared with a typical RTT measurement environment, the second sound signal is transmitted D2 earlier. Hence, by summing up D1 and D2, the same value as the RTT assuming that the second sound signal is transmitted after the first sound signal is received at the second device 120 can be obtained. Thus, a propagation delay time of the sound signal can be calculated by dividing the sum of D1 and D2 by two, and the distance can be measured by dividing the propagation delay time by a sound signal speed.

According to the above detailed embodiments, the distance is measured using the radio signal and the sound signal in FIG. 6A, and the distance is measured using the sound signals in FIG. 6B. The present disclosure is not limited to such distance measurement principles, and can adopt other distance measurement methods.

Figure 7:
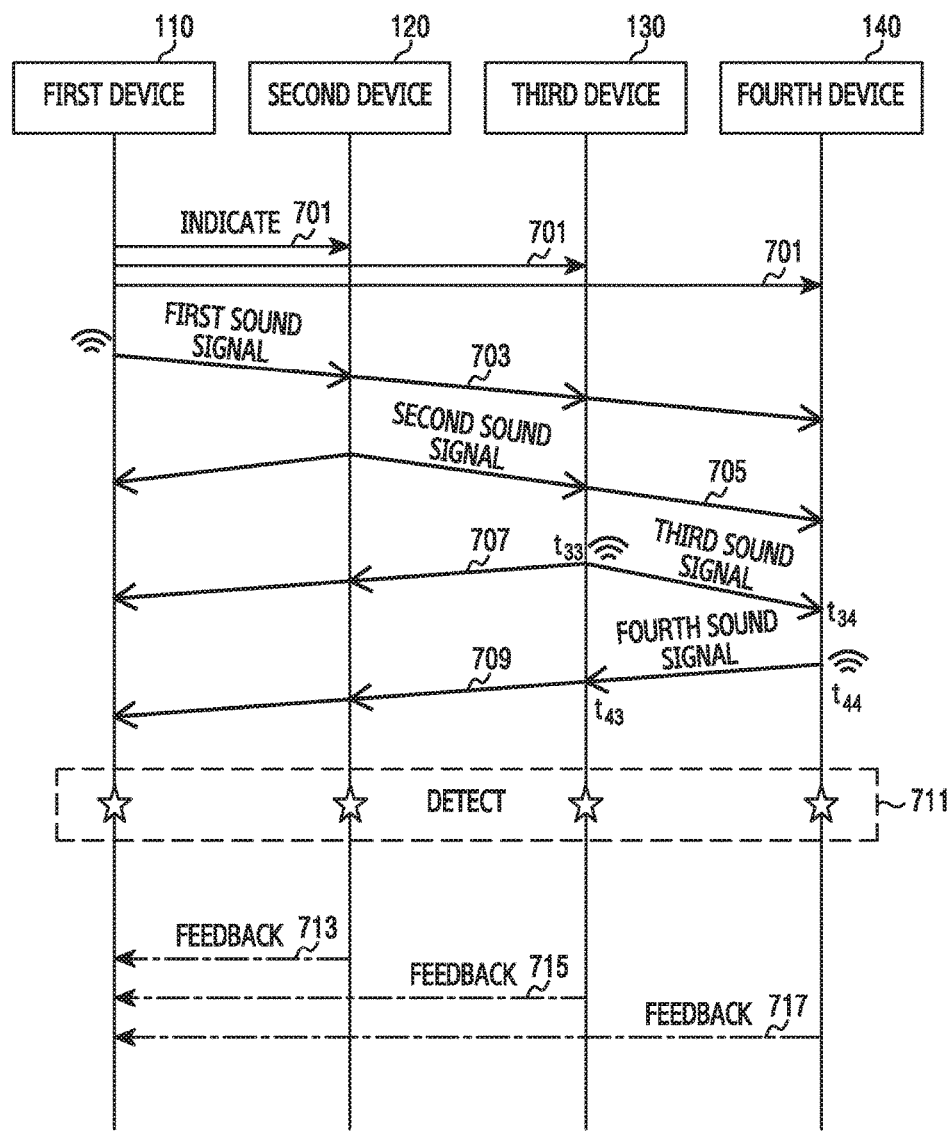
FIG. 7 illustrates signals exchanged for distance measurement of multiple devices as operated by an electronic device according to an embodiment of the present disclosure.

FIG. 7 illustrates signals exchanged for distance measurement of multiple devices of an electronic device according to an embodiment of the present disclosure. In FIG. 7, the distance measurement of FIG. 6B is adopted.

Referring to FIG. 7, in operation 701, the first device 110 sends an indicate message to the second device 120, a third device 130, and a fourth device 140. The indicate message can include distance measurement related information. For example, the distance measurement related information can include at least one of an indication indicating the distance measurement, sound signal transmit scheduling information (e.g., a transmit time, a sound signal pattern) of each device, the number of the devices participating in the distance measurement, and identification information of at least one device for the distance measurement.

In operation 703, the first device 110 sends a first sound signal, and the other devices 120, 130, and 140 receive the first sound signal. In operation 705, the second device 120 sends a second sound signal and the other devices 110, 130, and 140 receive the second sound signal. In operation 707, the third device 130 sends a third sound signal and the other devices 110, 120, and 140 receive the third sound signal. In operation 709, the fourth device 140 sends a fourth sound signal and the other devices 110, 120, and 130 receive the fourth sound signal. For example, the third sound signal is transmitted at time $t_{33}$ and received at the fourth device 140 at the time $t_{34}$. The fourth sound signal is transmitted at time $t_{44}$ and received at the fourth device 140 at the time $t_{43}$.

In operation 711, the first device 110, the second device 120, the third device 130, and the fourth device 140 each detect receive times of the sound signals. For example, the first device 110, the second device 120, the third device 130, and the fourth device 140 each can record the sound signals and then determine the received times of the sound signals based on the recording data. According to another embodiment, contrary to FIG. 7, the detection in operation 711 can be performed when the devices 110 through 140 each receive the corresponding sound signal.

In operation 713, the second device 120 feeds a detection result to the first device 110. In operation 715, the third device 130 feeds a detection result to the first device 110. In operation 717, the fourth device 140 feeds a detection result to the first device 110. The information fed back from the devices 120, 130, and 140 notifies the received time of at least one of the first sound signal, the second sound signal, the third sound signal, and the fourth sound signal detected by the corresponding device. Hence, the first device 110 can determine distances between the devices 110 through 140 using the received feedback information. For example, the distance between the third device 130 and the fourth device 140 can be calculated based on Equation 1.

$$\frac{((T_{43} - T_{33}) - (T_{44} - T_{34})) \times V_S}{2} \quad (1)$$

In Equation 1, $T_{43}$ denotes the receive time (e.g. $t_{43}$) of the fourth sound signal at the third device 130, $T_{33}$ denotes the transmit time (e.g. $t_{33}$) of the third sound signal from the third device 130, $T_{44}$ denotes the transmit time (e.g. $t_{44}$) of the fourth sound signal from the fourth device 140, $T_{34}$ denotes the receive time (e.g. $t_{34}$) of the third sound signal at the fourth device 140, and $V_S$ denotes the propagation speed of the sound signal.

Figure 8:
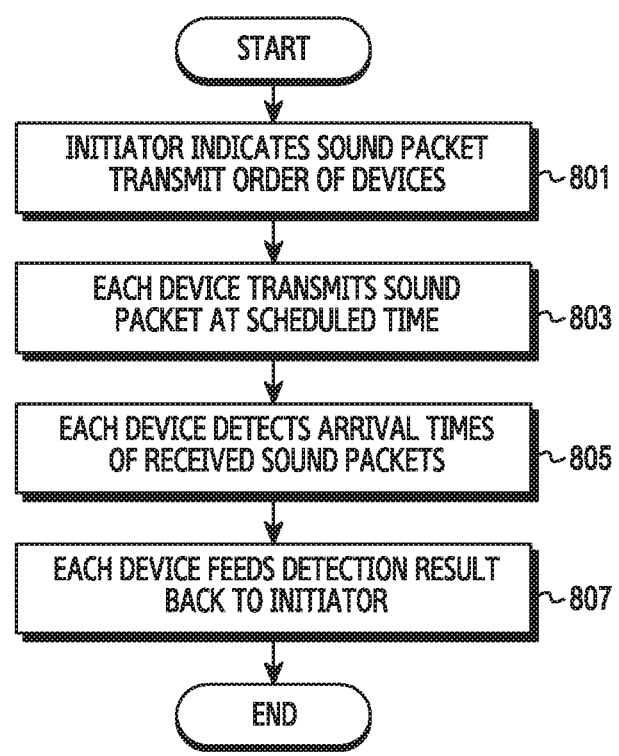
FIG. 8 illustrates a distance measurement method operated by an electronic device for measuring distances between multiple devices according to an embodiment of the present disclosure.

FIG. 8 illustrates a distance measurement method of devices in an electronic device according to an embodiment of the present disclosure. In FIG. 8, distances are measured through the signal exchange of FIG. 7. In FIG. 8, the first device 110 controlling the distance measurement is referred to as an initiator. The second device 120, the third device 130, and the fourth device 140 can be referred to as participants.

Referring to FIG. 8, in operation 801, the initiator indicates a sound packet transmission order of the devices. That is, the initiator notifies a sound signal scheduling result to the other devices. In operation 803, each device transmits a sound packet at the scheduled time. The sound packet is transmitted through a speaker. Hence, the devices including the initiator receive mutual sound signals. In operation 805, each device including the initiator detects arrival times of the received sound packets. In operation 807, each device feeds its detection result back to the initiator.

Figure 9:
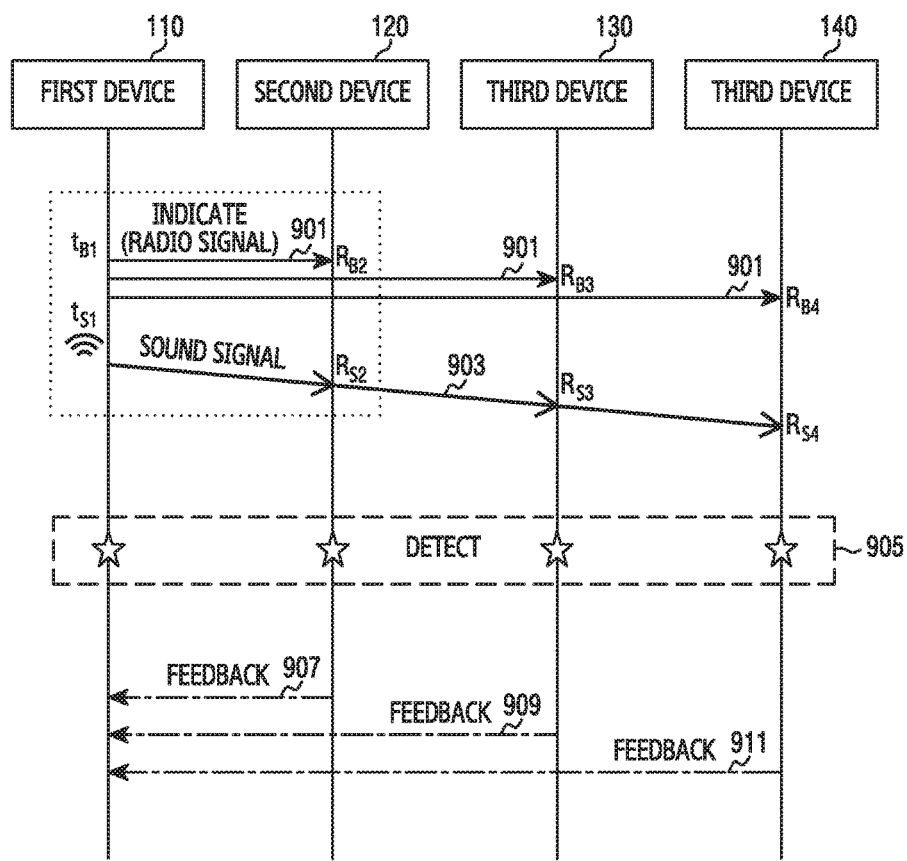
FIG. 9 illustrates signals exchanged in an electronic device for distance measurement of multiple devices according to another embodiment of the present disclosure.

FIG. 9 illustrates signals exchanged for distance measurement of multiple devices in an electronic device according to another embodiment of the present disclosure. In FIG. 9, the distance measurement of FIG. 6A is adopted.

Referring to FIG. 9, in operation 901, the first device 110 sends an indicate message to the second device 120, the third device 130, and the fourth device 140. The indicate message is used as an RF time reference. That is, the indicate message is used as a radio signal for the distance measurement. The indicate message can include distance measurement related information. For example, the distance measurement related information can include at least one of an indication indicating the distance measurement, sound signal transmission scheduling (e.g., a transmit time, a sound signal pattern), the number of the devices participating in the distance measurement, and identification information of at least one device for the distance measurement. The indicate message is transmitted at time $t_{B1}$ and received at the second device 120 at time $R_{B2}$, at the third device 130 at time $R_{B3}$, and at the fourth device 140 at time $R_{B4}$.

In operation 903, the first device 110 transmits a sound signal and the other devices 120, 130, and 140 receive the sound signal. The sound signal can include tones in a predefined pattern. The sound signal is transmitted at time $t_{S1}$ and received at the second device 120 at time $R_{S2}$, at the third device 130 at time $R_{S3}$, and at the fourth device 140 at time $R_{S4}$.

In operation 905, the first device 110, the second device 120, the third device 130, and the fourth device 140 each detect receive times of the radio signal (e.g., the indicate message) and the sound signal. According to another embodiment, contrary to FIG. 7, the detection in operation 905 can be performed when the devices 120, 130, and 140 each receive the corresponding signal.

In operation 907, the second device 120 feeds a detection result to the first device 110. In operation 909, the third device 130 feeds a detection result to the first device 110. In operation 911, the fourth device 140 feeds a detection result to the first device 110. The information fed back from the devices 120, 130, and 140 notifies the receive times of the radio signal and the sound signal detected by the corresponding device. Hence, the first device 110 can determine distances between the devices 110 through 140 using the received feedback information. For example, the distance between the third device 130 and the fourth device 140 can be calculated based on Equation 2.

$$((R_{S4} - R_{B4}) - (R_{S3} - R_{B3})) \times V_S \quad (2)$$

In Equation 2, $R_{S4}$ denotes the receive time of the sound signal at the fourth device 140, $R_{B4}$ denotes the receive time of the radio signal at the fourth device 140, $R_{S3}$ denotes the receive time of the sound signal at the third device 130, $R_{B3}$ denotes the receive time of the radio signal at the third device 130, $V_S$ denotes a propagation speed difference of the radio signal and the sound signal.

Figure 10:
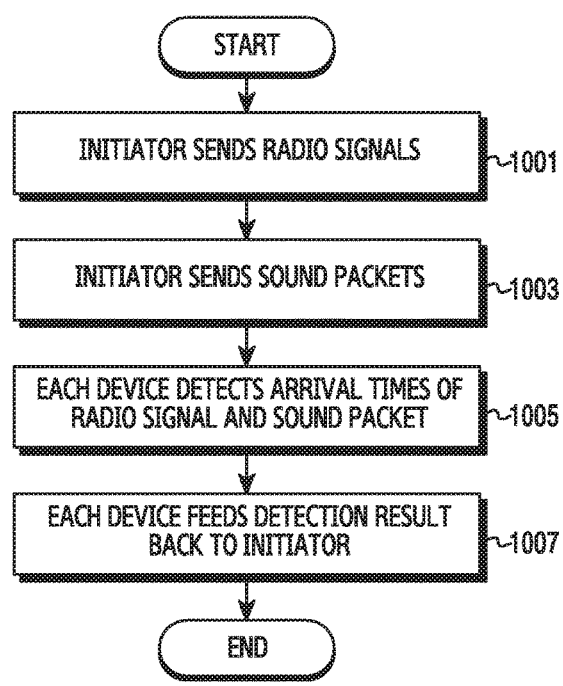
FIG. 10 illustrates a distance measurement method operated by an electronic device for distance measurement of multiple devices according to another embodiment of the present disclosure.

FIG. 10 illustrates a distance measurement method of devices in an electronic device according to another embodiment of the present disclosure. In FIG. 10, distances are measured through the signal exchange of FIG. 9. In FIG. 10, the first device 110 controlling the distance measurement is referred to as an initiator. The second device 120, the third device 130, and the fourth device 140 can be referred to as participants.

Referring to FIG. 10, in operation 1001, the initiator transmits radio signals and the other devices receive the radio signal. Herein, the radio signal can include distance measurement related information. In operation 1003, the initiator transmits sound packets and the other devices receive the sound packet. The sound packet, that is, the sound signal is transmitted through a speaker. Hence, the devices including the initiator receive mutual sound signals. In operation 1005, each device detects arrival times of the radio signal and the sound packet. In operation 1007, each device feeds its detection result back to the initiator.

Figure 11:
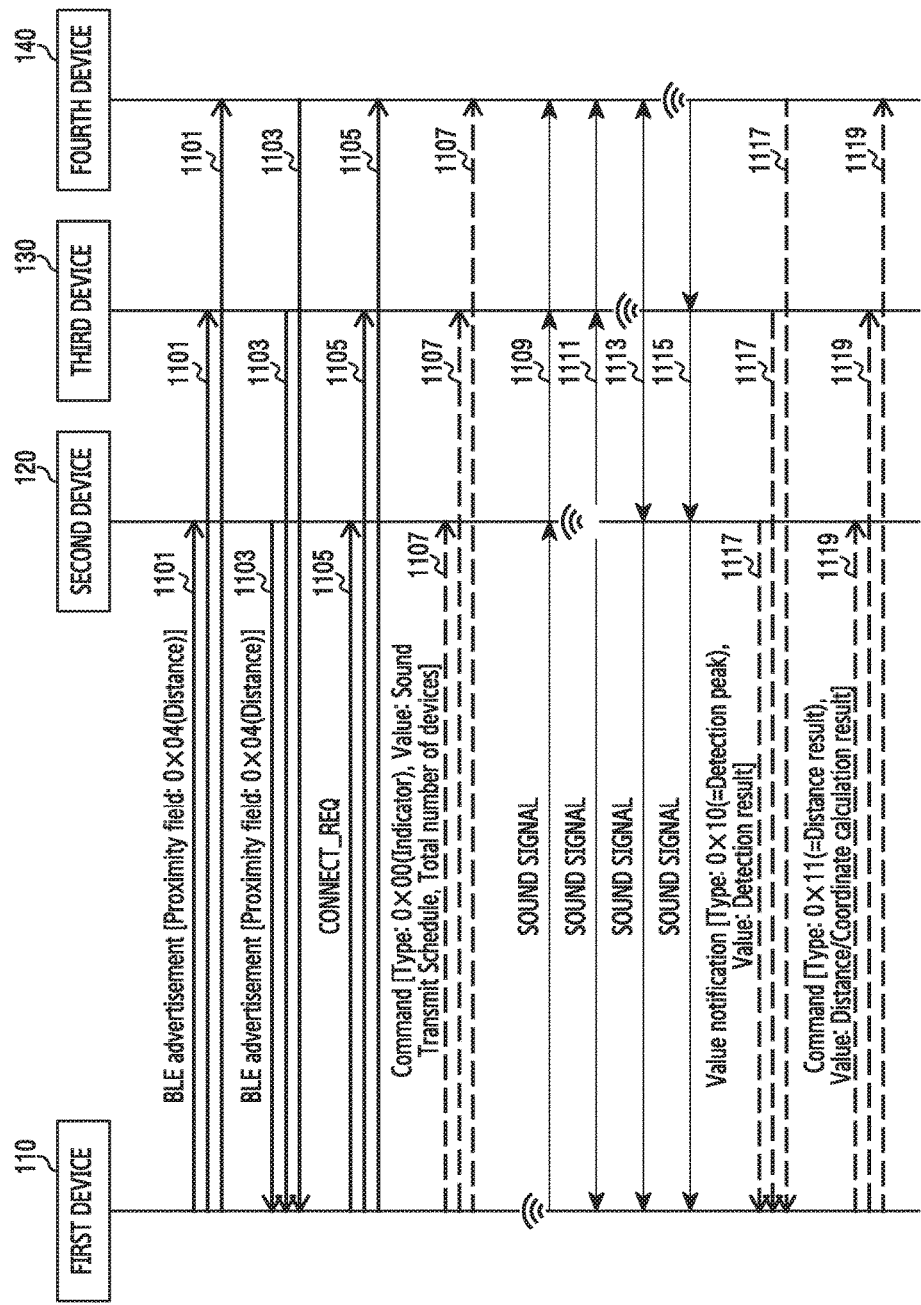
FIG. 11 illustrates signals exchanged to position electronic devices according to an embodiment of the present disclosure.

FIG. 11 illustrates signals exchanged to position electronic devices according to an embodiment of the present disclosure. In FIG. 11, each device provides the initiator with measurement information for distance measurement. Also, devices 110 through 140 perform BLE based communication in FIG. 11.

Referring to FIG. 11, in operation 1101, the first device 110 transmits messages for discovering neighboring devices. For example, the first device 110 can send BLE advertisement messages. In operation 1103, the second device 120, the third device 130, and the fourth device 140 each send a response message of the message received from the first device 110. For example, the second device 120, the third device 130, and the fourth device 140 each can send a BLE advertisement message. Herein, the BLE advertisement messages can include an indicator indicating the distance measurement. For example, the BLE advertisement messages can include a proximity field, and the proximity field can be set to a value (e.g., 0x04) indicating a distance. In operation 1105, the first device 110 transmits connection request (CONNECT_REQ) messages to the second device 120, the third device 130, and the fourth device 140. Hence, the connections can be established between the devices 110 through 140.

In operation 1107, the first device 110 transmits a message including necessary information for the distance measurement. For example, the first device 110 can send a command message. The command message can include parameters such as type and value. The type can be set to a value (e.g., 0x00) indicative of the indicator. The value can be set to indicate sound transmission scheduling information (e.g., a transmit time, a sound signal pattern) and the number of devices participating in the distance measurement.

In operation 1109, the first device 110 sends first sound signals, and the other devices 120, 130, and 140 receive the first sound signal. In operation 1111, the second device 120 sends second sound signals and the other devices 110, 130, and 140 receive the second sound signal. In operation 1113, the third device 130 sends third sound signals and the other devices 110, 120, and 140 receive the third sound signal. In operation 1115, the fourth device 140 sends fourth sound signals and the other devices 110, 120, and 130 receive the fourth sound signal. The devices 110 through 140 each determine the receive times of the sound signals.

In operation 1117, the second device 120, the third device 130, and the fourth device 140 each send a message notifying the sound signal receive times to the first device 110. For example, the second device 120, the third device 130, and the fourth device 140 each can send a value notification message. The value notification message can include parameters such as type and value. The type can be set to a value (e.g., 0x10) indicating detection peak. The value can indicate a detection result. Hence, the first device 110 can determine the distances between the devices 110 through 140 and measure the positions, that is, relative position relations.

In operation 1119, the first device 110 transmits messages notifying the distance or the position. For example, the first device 110 can send command messages. The command message can include parameters such as type and value. The type can set to a value (e.g., 0x11) indicating a distance result. The value can indicate a distance or coordinate calculation result. Herein, the coordinates can be relative coordinates based on the first device 110.

Figure 12:
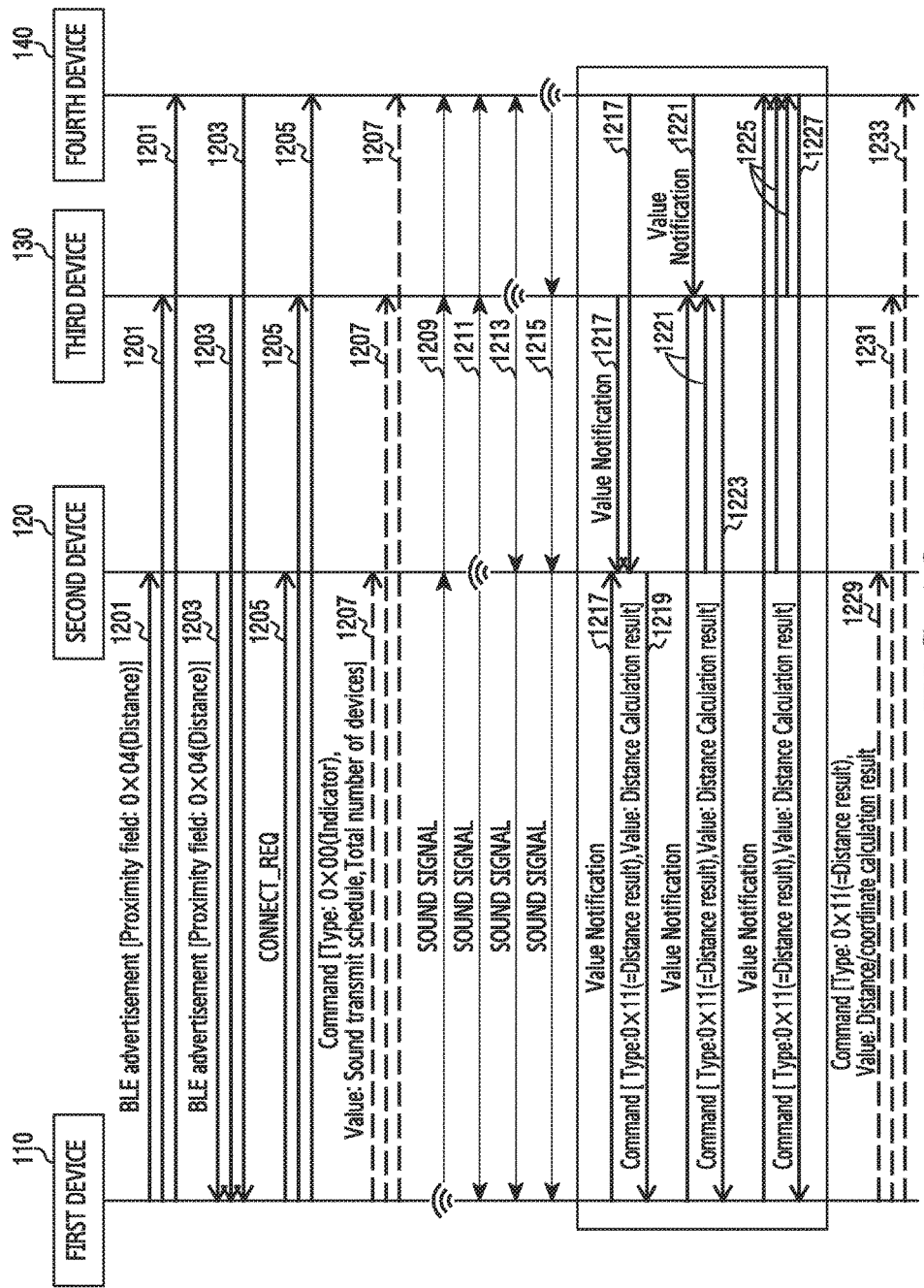
FIG. 12 illustrates signals exchanged to position electronic devices according to another embodiment of the present disclosure.

FIG. 12 illustrates signals exchanged for positioning electronic devices according to another embodiment of the present disclosure. In FIG. 12, each device determines distances form other devices and provides distance information to the initiator. Also, devices 110 through 140 perform BLE based communication in FIG. 12.

Referring to FIG. 12, in operation 1210, the first device 110 transmits messages for discovering neighboring devices. For example, the first device 110 can send BLE advertisement messages. In operation 1203, the second device 120, the third device 130, and the fourth device 140 each send a response message of the message received from the first device 110. For example, the second device 120, the third device 130, and the fourth device 140 each can send a BLE advertisement message. Herein, the BLE advertisement messages can include an indicator indicating the distance measurement. For example, the BLE advertisement messages can include a proximity field, and the proximity field can be set to a value (e.g., 0x04) indicating a distance. In operation 1205, the first device 110 sends CONNECT_REQ messages to the second device 120, the third device 130, and the fourth device 140. Hence, the connections can be established between the devices 110 through 140.

In operation 1207, the first device 110 sends a message including necessary information for the distance measurement. For example, the first device 110 can send a command message. The command message can include parameters such as type and value. The type can be set to a value (e.g., 0x00) indicative of the indicator. The value can indicate sound transmission scheduling information (e.g., a transmit time, a sound signal pattern) and the number of devices participating in the distance measurement.

In operation 1209, the first device 110 sends first sound signals and the other devices 120, 130, and 140 receive the first sound signal. In operation 1211, the second device 120 sends second sound signals and the other devices 110, 130, and 140 receive the second sound signal. In operation 1213, the third device 130 sends third sound signals and the other devices 110, 120, and 140 receive the third sound signal. In operation 1215, the fourth device 140 sends fourth sound signals and the other devices 110, 120, and 130 receive the fourth sound signal. The devices 110 through 140 each determine the receive times of the sound signals.

In operation 1217, the first device 110, the third device 130, and the fourth device 140 each send a message of necessary information for the second device 120 to measure the distances from the other devices. That is, the second device 120 receives measurement information of the other devices 110, 130, and 140. For example, the first device 110, the third device 130, and the fourth device 140 each can transmit a value notification message including the measurement information. Hence, the second device 120 can determine distances from the other devices 110, 130, and 140. In operation 1219, the second device 120 sends a message notifying the distances from the other devices 110, 130, and 140, to the first device 110. For example, the second device 120 can send a command message. The command message can include parameters such as type and value. The type can indicate a distance result. The value can indicate a distance calculation result.

In operation 1221, the first device 110, the second device 120, and the fourth device 140 each send a message of necessary information for the third device 130 to measure the distances from the other devices. That is, the third device 130 receives measurement information of the other devices 110, 120, and 140. For example, the first device 110, the second device 120, and the fourth device 140 each can send a value notification message including the measurement information. Hence, the third device 130 can determine distances from the other devices 110, 120, and 140. In operation 1223, the third device 130 transmits a message notifying the distances from the other devices 110, 120, and 140, to the first device 110. For example, the third device 130 can send a command message. The command message can include parameters such as type and value. The type can indicate a distance result. The value can indicate a distance calculation result.

In operation 1225, the first device 110, the second device 120, and the third device 130 each send a message of necessary information for the fourth device 140 to measure the distances from the other devices. That is, the fourth device 140 receives measurement information of the other devices 110, 120, and 130. For example, the first device 110, the second device 120, and the third device 130 each can send a value notification message including the measurement information. Hence, the fourth device 140 can determine distances from the other devices 110, 120, and 130. In operation 1227, the fourth device 140 sends a message notifying the distances from the other devices 110, 120, and 130, to the first device 110. For example, the fourth device 140 can send a command message. The command message can include parameters such as type and value. The type can indicate a distance result. The value can indicate a distance calculation result.

In operations 1229, 1231, and 1233, the first device 110 transmits messages notifying the positions. For example, the first device 110 can send command messages. The command message can include parameters such as type and value. The type can indicate a distance result. The value can indicate a distance or coordinate calculation result. Herein, the coordinates can be relative coordinates based on the first device 110.

As shown in FIG. 11 and FIG. 12, the initiator, that is, the first device 110 can calculate or receive the information about the distances between the devices including the first device 110, and determine the relative positions of the devices based on the distance information. More specifically, the relative positions can be determined as shown in FIG. 13.

Figure 13A:
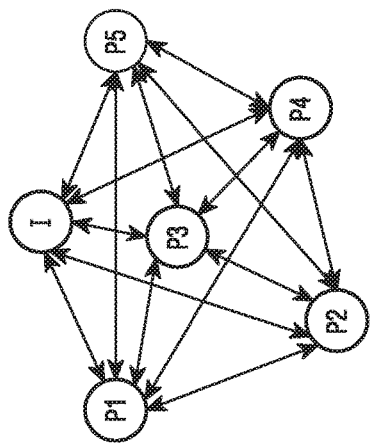
FIGS. 13A and 13B illustrate input information and output information for positioning in an electronic device according to an embodiment of the present disclosure.
Figure 13B:
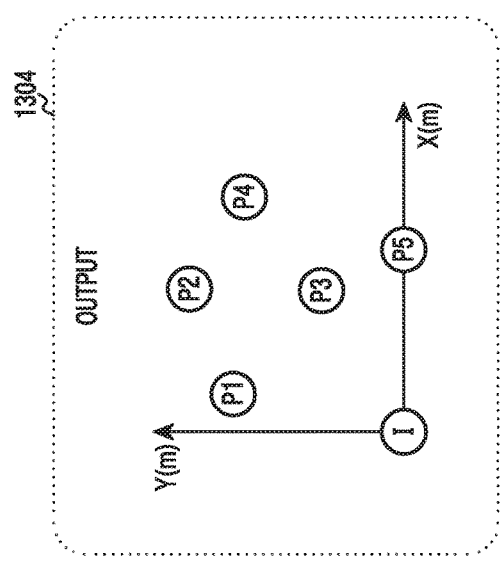

FIG. 13 depicts input information and output information for positioning in an electronic device according to an embodiment of the present disclosure. In FIG. 13, 'I' denotes the initiator and 'Pn' denotes an n-th participant. When multiple devices are deployed as shown in FIG. 13A, output information 1304 is generated from input information 1302 as shown in FIG. 13B. That is, the initiator device uses distance information of the devices as the input information 1302. The input information 1302 is one-dimensional information of the devices and indicates distances. The initiator device generates the output information 1304 indicating relative positions of the devices based on the input information 1302. That is, the output information 1304, which is two-dimensional information, indicates the relative positions. The output information 1304 can be generated from the input information 1302 as shown in FIG. 14.

Figure 14A:
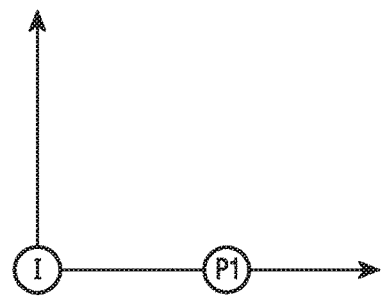
FIGS. 14A, 14B, and 14C illustrate relative positions determined in an electronic device according to an embodiment of the present disclosure.
Figure 14B:
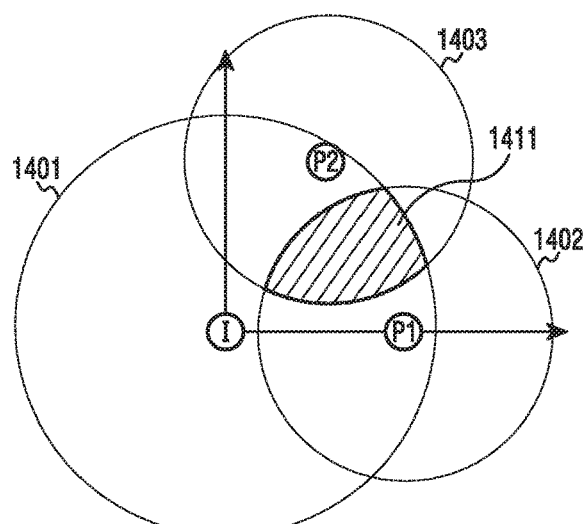
Figure 14C:
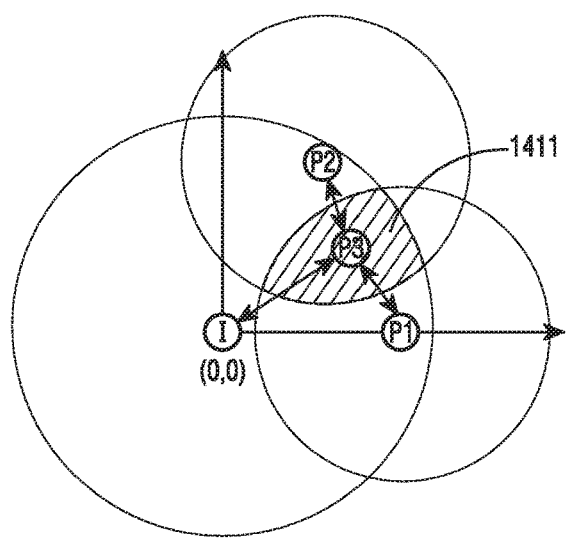

FIGS. 14A, 14B, and 14C depict relative positions determined in an electronic device according to an embodiment of the present disclosure. In FIG. 14, relative positions of P1, P2, and P3 are determined in a similar situation to FIG. 13. The initiator can select N-ary devices. In so doing, the initiator can select the N-ary devices in device discovery order, at random, or based on (e.g., in descending order of) Received Signal Strength (RSS). Next, the initiator places its position at the origin and places P1 on the x axis according to a distance from P1 as shown in FIG. 14A. Next, the initiator places P2 and P3 in sequence.

As shown in FIG. 14B, the initiator sets an area 1411 for placing P3 based on the positions of P1 and P2. Hereafter, to ease the understanding, the placing area is referred to as an available area. More specifically, to obtain coordinates of the N-th participant, the initiator sets the available area with respect to coordinates of devices up to (N−1)-th devices. Herein, the available area indicates an area within distances of corresponding coordinates and the devices up to the (N−1)-th devices. That is, the available area includes an overlapping portion of (N−1)-ary circles having a distance from the (N−1)-ary devices to the N-ary device, that is, to a destination device, as the radius. In further detail, as shown in FIG. 14B, an available area 1411 for P3 is an overlapping section of a first area 1401 defined based on a measured distance between the initiator and P3 based on the initiator, a second area 1402 defined based on a measured distance between P1 and P3 based on P1, and a third area 1403 defined based on a measured distance between P2 and P3 based on P2.

Next, the initiator determines selectable coordinates in the available area, as candidate coordinates of the N-th device. The number of the candidate coordinates can differ according to a resolution of the coordinates. The initiator determines one of the candidate coordinates as the coordinates of the N-th device. As shown in FIG. 14C, the initiator determines coordinates of P3 within the available area 1411. In so doing, the initiator selects coordinates having the minimum sum of distance errors, that is, the coordinates having the minimum sum of the distance errors of the coordinates of the devices up to the (N−1)-th device. More specifically, the initiator sums up differences between distances from the deployed devices to certain candidate coordinates and the measured distances from the deployed devices to the destination device with respect to all the candidate coordinates, and selects candidate coordinates of the minimum sum. For example, the coordinates of the destination device can be defined based on Equation 3.

$$p_n = \underset{p_n}{\mathrm{argmin}} \sum (\|p_n - p_k\|_2 - d_k)^2 \quad (3)$$

In Equation 3, $p_n$ denote n-th candidate coordinates, $p_k$ denotes coordinates of a k-th device deployed, and $d_k$ denotes a measured distance between the destination device and the deployed k-th device.

In FIG. 14, the coordinates of the destination device are determined based on the distance error. However, the present disclosure is not limited to the coordinate determination using the distance error, and can adopt other coordinate determination methods according to various embodiments.

For example, the coordinates can be determined using an Eigen value. In this case, a matrix representing distances between devices is used as an input matrix. For example, the input matrix can be generated like the input information 1302 of FIG. 13. The initiator calculates an average u of the input matrix, subtracts the average value u from each element of the input matrix, and thus determines a matrix X having the average of 0. The initiator calculates a covariance matrix of the matrix X. The covariance matrix can be calculated based on Equation 4.

$$C = \frac{1}{n} \times (X \quad X^T) \quad (4)$$

In Equation 4, C denotes the covariance matrix, n denotes the number of the elements of the input matrix, and X denotes the matrix obtained by subtracting the average value u from each element of the input matrix.

After calculating the covariance matrix, the initiator determines at least one Eigen vector for the covariance matrix. The initiator determines at least one Eigen value corresponding to the at least one Eigen vector. Next, the initiator selects two Eigen vectors having the greatest Eigen value and thus constructs a matrix P based on Equation 5.

$$P = \begin{bmatrix} u_1 \\ u_2 \end{bmatrix} \quad (5)$$

In Equation 5, P denotes a matrix including Eigen vectors, $u_1$ denotes an Eigen vector having the greatest Eigen value, and $u_2$ denotes an Eigen vector having the second greatest Eigen value.

After determining the vector P, the initiator can determine two-dimensional coordinates using the vector P and the matrix X based on Equation 6.

$$Y = PX \quad (6)$$

In Equation 6, Y denotes a matrix indicating the coordinates, P denotes the matrix including the Eigen vectors, and X denotes a matrix obtained by subtracting the average value u from every element of the input matrix.

As such, the electronic device can measure the position relations of the multiple devices, that is, determine the topology based on the distance measurement. Notably, since the topology is determined based on the distance measurement, the topology can be determined only for the devices within the distance measurement range of a particular initiator. Hence, the device determining the topology can request other device to determine the relative position and thus the topology can be extended. Requesting to determine the relative position can transfer the relative positioning function. Since the topology, that is, the relative positions are determined by the initiator, the relative positioning function can be referred to as an initiator function. Other embodiments for extending the topology range by transferring the initiator function are now explained.

Figure 15:
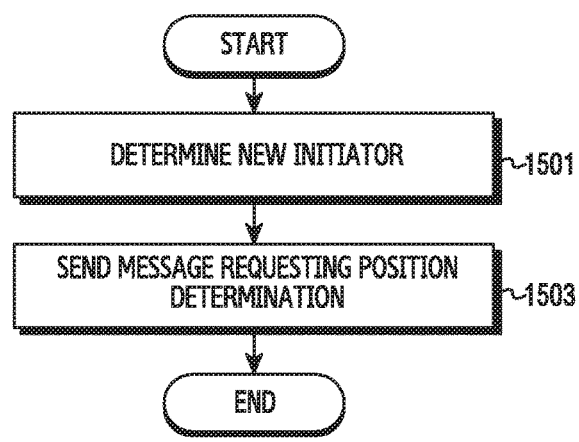
FIG. 15 illustrates a method for changing an initiator of an electronic device according to an embodiment of the present disclosure.

FIG. 15 illustrates a method for changing an initiator of an electronic device according to an embodiment of the present disclosure. FIG. 15 illustrates operations of a preceding initiator device which transfers an initiator function.

Referring to FIG. 15, the electronic device determines a new initiator in operation 1501. That is, the electronic device determines another device for determining the positions. For example, the electronic device can determine the new initiator based on at least one of a distance from the electronic device, positions of devices in the topology, a distance from a target device, a user's selection, discovery, cellular network connection, and a device type. For example, the electronic device can determine one of the devices on edges of the topology as the new initiator. For example, the electronic device can determine another device farthest from the electronic device, as the new initiator. For example, the electronic device can determine one of devices discovered outside sound signal coverage, as the new initiator. For example, the electronic device can determine another device connected to the cellular network as the new initiator. For example, the electronic device can determine a fixed node such as a base station, as the new initiator.

In operation 1503, the electronic device sends a message requesting to determine the position. That is, the electronic device sends a message for transferring the initiator function to the another device. The message can include an indicator requesting the initiator function. The message can be unicast or broadcast. Hence, the new initiator determines a new topology and thus the topology can be extended.

Figure 16:
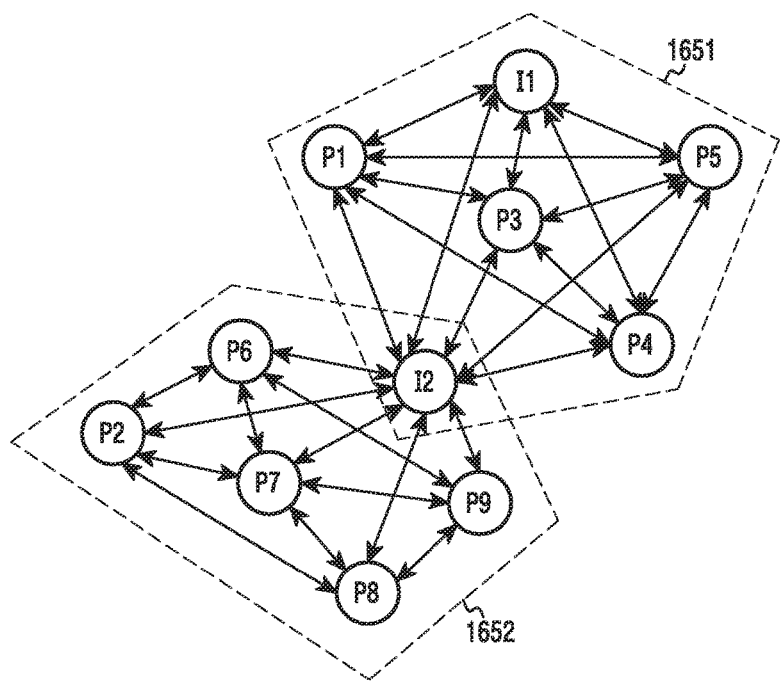
FIG. 16 illustrates initiator change according to an embodiment of the present disclosure.

FIG. 16 depicts initiator change according to an embodiment of the present disclosure. In FIG. 16, a topology is extended by selecting one of devices on edges of the topology generated by an initiator in an initial measurement range, as a new initiator.

Referring to FIG. 16, a preceding initiator I1 determines a first topology 1651 and a next initiator I2 determines a second topology 1652. Initially, the preceding initiator I1 measures distances between devices I1, P1, P3, P4, P5, and I2 and determines relative position relations, that is, the first topology 1651 of the devices I1, P1, P3, P4, P5, and I2. However, the device I1 cannot measure distances from devices P2, P6, P7, P8, and P9. Accordingly, the device I1 transfers its initiator function to the I2 on the edge of the topology. The device I2, which is the next initiator, measures the distances between I2, P2, P6, P7, P8, and P9 and determines relative position relations, that is, the second topology 1652 of the devices I2, P2, P6, P7, P8, and P9. The device I1 or the device I2 can combine the first topology 1651 and the second topology 1652 and thus determine the topology covering all of the devices I1, I2, P1, P2, P3, P4, P5, P6, P7, P8, and P9.

Figure 17:
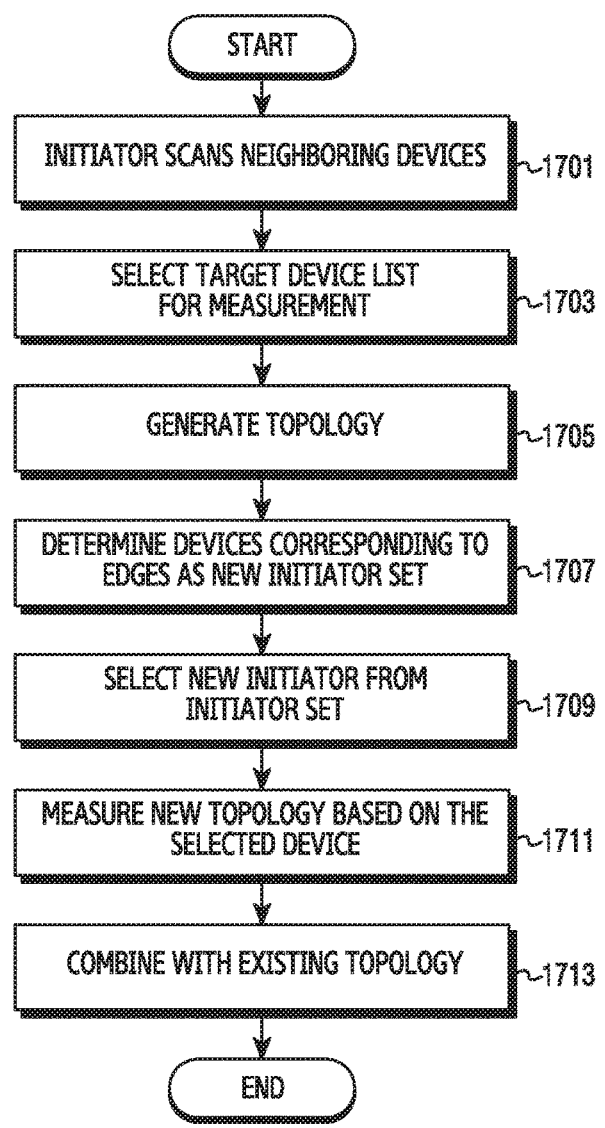
FIG. 17 illustrates a method for changing an initiator according to an embodiment of the present disclosure.

FIG. 17 illustrates a method for changing an initiator according to an embodiment of the present disclosure. FIG. 17 illustrates the operations of FIG. 16.

Referring to FIG. 17, the initiator scans neighboring devices in operation 1701. For doing so, the initiator can send a radio signal for discovery or scanning. For example, the initiator can periodically send the radio signal for the discovery or the scanning.

In operation 1703, the initiator selects a target device list for the measurement. That is, all or some of devices discovered by the radio signals can be selected as target devices. For example, the initiator can select N-ary devices in device discovery order, at random, or based on (e.g., in descending order of) RSS.

In operation 1705, the initiator generates a topology. That is, the initiator performs distance measurement and generates the topology based on the measured distance information. Specifically, the initiator transmits at least one signal (e.g., a radio signal, a sound signal) for the distance measurement, receives necessary data (e.g., distance measurement results or measurement data) for the distance measurement from other devices, and then measures distances between the devices. The initiator determines coordinates having the minimum sum of distance errors, as the device positions and thus determines the topology, that is, relative position relations.

In operation 1707, the initiator determines devices corresponding to topology edges as a new initiator set. That is, the initiator determines at least one device on the topology edges, as a next initiator candidate for the topology extension. For example, the devices P1, I2, P4, and P5 in FIG. 16 are determined as the candidates.

In operation 1709, the initiator selects a new initiator from the initiator set. That is, the initiator selects the next initiator. In so doing, various criteria can be applied. For example, the initiator can select the next initiator based on at least one of the distance to the initiator, an extension direction, and capability of the candidates.

In operation 1711, the selected new initiator measures a new topology based on the new initiator. That is, the new initiator, that is, the next initiator determines the topology based on itself in the similar manner to operation 1705. In detail, the next initiator transmits at least one signal (e.g., a radio signal, a sound signal) for the distance measurement, receives necessary data (e.g., distance measurement results or measurement data) for the distance measurement from other devices, and then measures distances between the devices. The next initiator determines the new topology by determining coordinates having the minimum sum of distance errors, as the device positions. The new topology can include at least one device not included in the topology generated in operation 1705.

In operation 1713, the initiator or the new initiator combines the new topology with the existing topology. For example, the new initiator can send the new topology information to the preceding initiator, and the preceding initiator can combine the topologies. Alternatively, the preceding initiator can transmit the existing topology information to the new initiator, and the new initiator can combine the topologies. Thus, the extended topology is attained.

Figure 18:
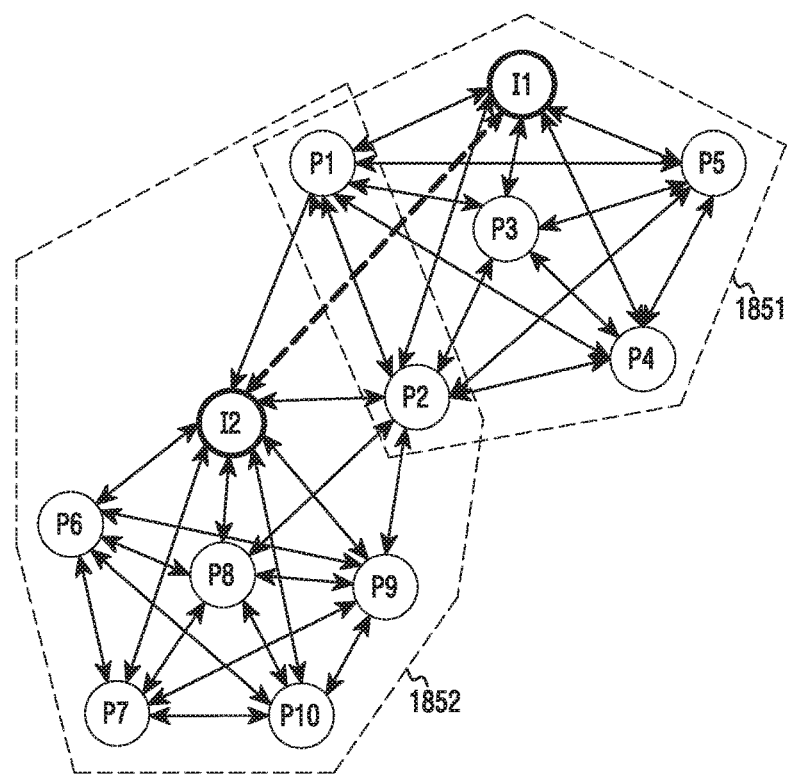
FIG. 18 illustrates initiator change according to another embodiment of the present disclosure.

FIG. 18 illustrates initiator change according to another embodiment of the present disclosure. In FIG. 18, a topology is extended by generating a new topology based on one of devices scanned by an initial initiator but not included in a distance measurement range.

Referring to FIG. 18, a preceding initiator I1 determines a first topology 1851 and a next initiator I2 determines a second topology 1852. Initially, the preceding initiator I1 measures distances between devices I1, P1, P2, P3, P4, and P5 and determines relative position relations, that is, the first topology 1851 of the devices I1, P1, P2, P3, P4, and P5. The device I2 is scanned or discovered by the device I1 by sending and receiving radio signals (e.g., advertisement message for discovery, connection request message) for the distance measurement, but is outside the sound signal coverage. Hence, the device I1 can detect the presence of the device I2 and communicate with the device I2 using radio signals, but the device I2 is not included in the first topology 1851. Accordingly, the device I1 transfers the initiator function to the device I2. The device I2, which is the next initiator, measures the distances between I2, P1, P2, P6, P7, P8, P9, and P10 and determines relative position relations, that is, the second topology 1852 of the devices I2, P1, P2, P6, P7, P8, P9, and P10. The device I1 or the device I2 can combine the first topology 1851 and the second topology 1852 and thus determine the topology covering all of the devices I1, I2, and P1 through P10.

Figure 19:
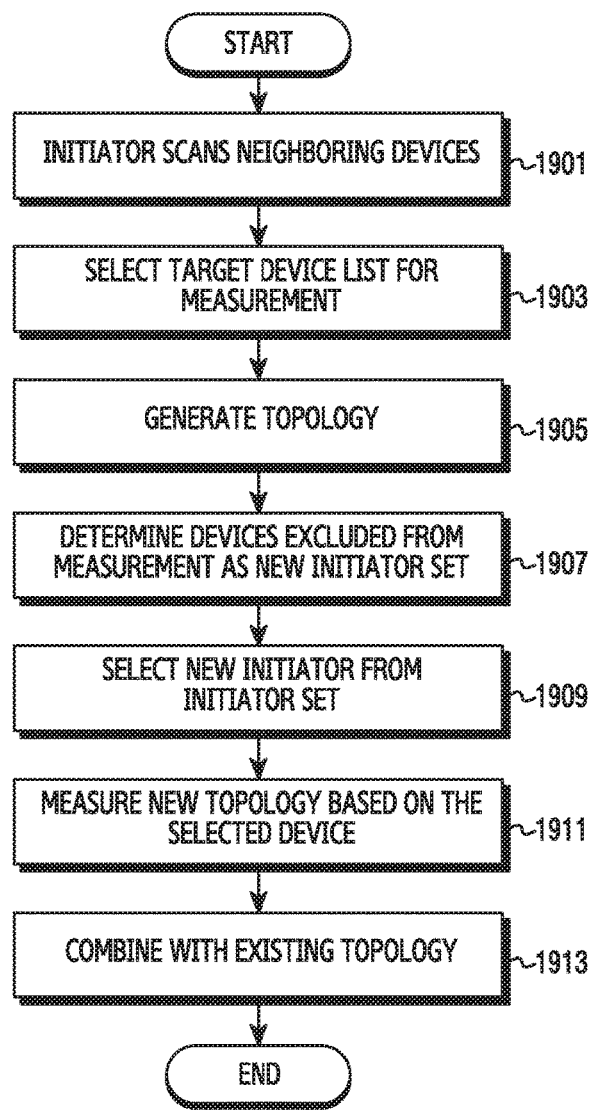
FIG. 19 illustrates a method for changing an initiator according to another embodiment of the present disclosure.

FIG. 19 illustrates a method for changing an initiator according to another embodiment of the present disclosure. FIG. 19 illustrates the operations of FIG. 18.

Referring to FIG. 19, the initiator scans neighboring devices in operation 1901. For doing so, the initiator can transmit a radio signal for discovery or scanning. For example, the initiator can periodically send the radio signal for the discovery or the scanning.

In operation 1903, the initiator selects a target device list for the measurement. That is, all or some of devices discovered by the radio signals can be selected as target devices. For example, the initiator can select N-ary devices in device discovery order, at random, or based on (e.g., in descending order of) RSS.

In operation 1905, the initiator generates a topology. That is, the initiator performs distance measurement and generates the topology based on the measured distance information. Specifically, the initiator sends at least one signal (e.g., a radio signal, a sound signal) for the distance measurement, receives necessary data (e.g., distance measurement results or measurement data) for the distance measurement from other devices, and then measures distances between the devices. The initiator determines coordinates having the minimum sum of distance errors, as the device positions and thus determines the topology, that is, relative position relations.

In operation 1907, the initiator determines devices excluded from the measurement, as a new initiator set. There can be at least one device discovered or scanned in operation 1901 but excluded from the distance measurement due to coverage difference of the radio signal and the sound signal. In this case, the initiator determines at least one device excluded from the distance measurement, as a next initiator candidate for the topology extension. For example, at least one other device including the device I2 is determined as the candidate in FIG. 17.

In operation 1909, the initiator selects a new initiator from the initiator set. That is, the initiator selects the new initiator. In so doing, various criteria can be applied. For example, the initiator can select the next initiator based on at least one of the distance to the initiator, an extension direction, and capability of the candidates.

In operation 1911, the new initiator selected measures a new topology based on the new initiator. That is, the new initiator, that is, the next initiator determines the topology based on itself in the similar manner to operation 1905. In detail, the next initiator sends at least one signal (e.g., a radio signal, a sound signal) for the distance measurement, receives necessary data (e.g., distance measurement results or measurement data) for the distance measurement from other devices, and then measures distances between the devices. The next initiator determines the new topology by determining coordinates having the minimum sum of distance errors, as the device positions. The new topology can include at least one device not included in the topology generated in operation 1905.

In operation 1913, the initiator or the new initiator combines the new topology with the existing topology. For example, the new initiator can transmit the new topology information to the preceding initiator, and the preceding initiator can combine the topologies. Alternatively, the preceding initiator can transmit the existing topology information to the new initiator, and the new initiator can combine the topologies. Thus, the extended topology is attained.

Figure 20:
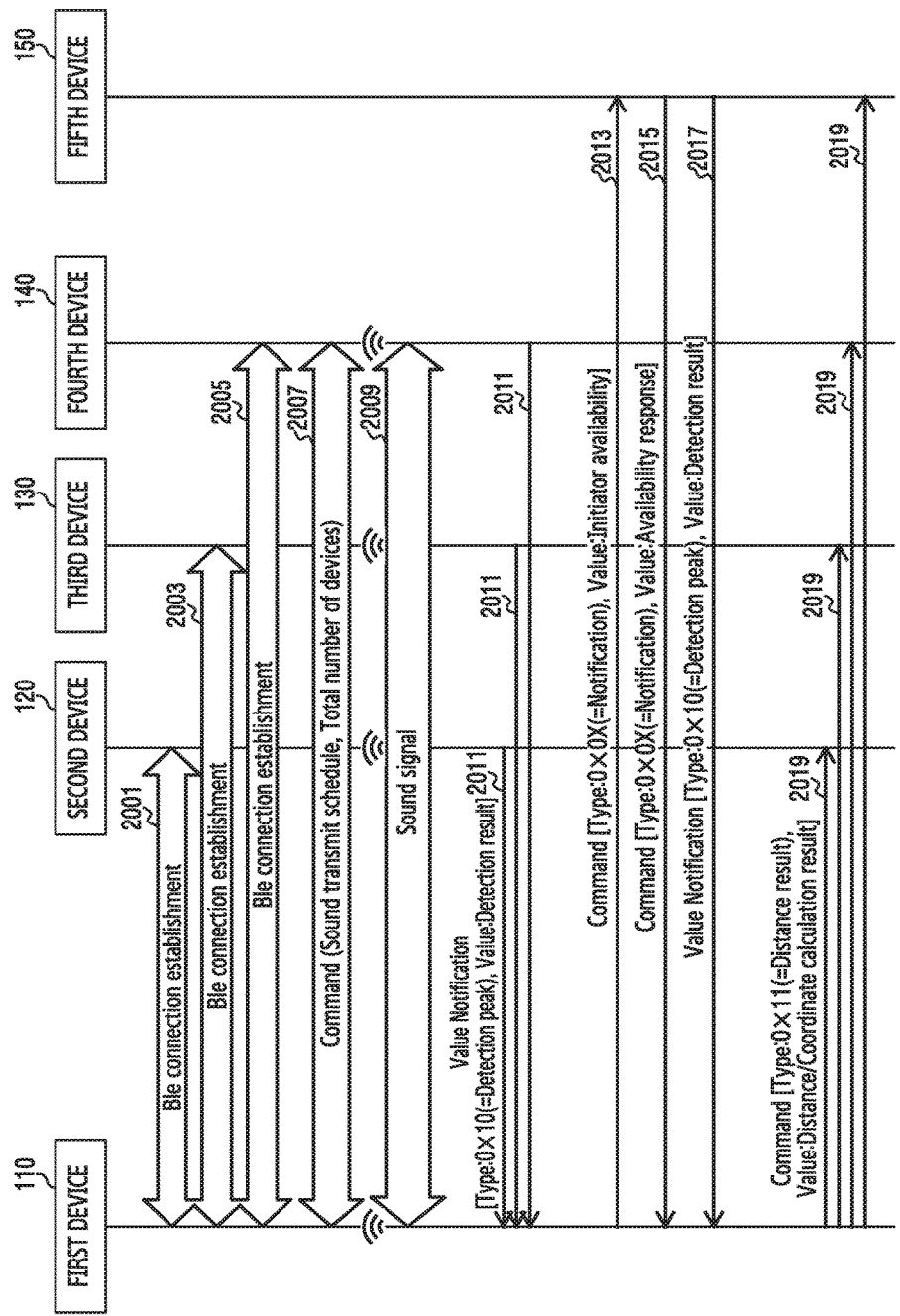
FIG. 20 illustrates signals exchanged to change an initiator according to an embodiment of the present disclosure.

FIG. 20 depicts signals exchanged to change an initiator according to an embodiment of the present disclosure. In FIG. 20, an initiator function is transferred from a first device 110 to a fifth device 150. Devices 110 through 150 perform BLE based communication in FIG. 20.

Referring to FIG. 20, in operation 2001, the first device 110 performs connection establishment with the second device 120. For doing so, the first device 110 and the second device 120 can send or receive at least one message for the discovery/scanning and the connection establishment. In operation 2003, the first device 110 performs connection establishment with the third device 130. For doing so, the first device 110 and the third device 130 can send or receive at least one message for the discovery/scanning and the connection establishment. In operation 2005, the first device 110 performs connection establishment with the fourth device 140. For doing so, the first device 110 and the fourth device 140 can send or receive at least one message for the discovery/scanning and the connection establishment.

In operation 2007, the first device 110 transmits control information for distance measurement to the other devices 120, 130, and 140. The control information can be carried by a command message. The control information can include at least one of sound signal transmission scheduling (e.g., a transmit time, a sound signal pattern), the number of the devices participating in the distance measurement, and identification information of at least one device for the distance measurement. The other devices 120, 130, and 140 can send an acknowledgement message in response to the received control information.

In operation 2009, the first device 110, the second device 120, the third device 130, and the fourth device 140 each transmit a sound signal. The first device 110, the second device 120, the third device 130, and the fourth device 140 each can send the sound signal of an allocated pattern at the scheduled time. Hence, the first device 110, the second device 120, the third device 130, and the fourth device 140 each can detect the sound signals received from the other devices.

In operation 2011, the second device 120, the third device 130, and the fourth device 140 each transmit a sound signal detection result to the first device 110. The detection result can be carried by a value notification message. The value notification message can include parameters such as type and value. The type can be set to a value (e.g., 0x10) indicating detection peak. The value can indicate the detection result. Hence, the first device 110 can determine distances between the devices 110 through 140 and measure the positions, that is, relative position relations.

In operation 2013, the first device 110 sends a message requesting to transfer the initiator function, to the fifth device 150. For example, the first device 110 can send a command message. The command message can include parameters such as type and value. The type can set to a value (e.g., 0x0X) indicating a notification. The value can indicate the request whether the initiator is feasible.

In operation 2015, the fifth device 150 sends to the first device 110, a response message for accepting the initiator function transfer. For example, the fifth device 150 can send a command message. The command message can include parameters such as type and value. The type can be set to a value (e.g., 0x0X) indicating the notification. The value can indicate the response whether the initiator is feasible. Next, although not depicted in FIG. 20, the fifth device 150 performs distance measurement and position measurement.

In operation 2017, the fifth device 150 transmits newly generated position information, that is, topology information to the first device 110. For example, the fifth device 110 can send a value notification message. The value notification message can include parameters such as type and value. The type can be set to a value (e.g., 0x10) indicating the detection peak. The value can indicate a detection result. Herein, the detection result includes the topology information newly determined based on the fifth device 150.

In operation 2019, the first device 110 sends messages notifying the distances or the positions to the other devices 120 through 150. For example, the first device 110 can send command messages. The command message can include parameters such as type and value. The type can be set to a value (e.g., 0x11) indicating a distance result. The value can indicate a distance or coordinate calculation result. Herein, the coordinates can be relative coordinates based on the first device 110 and include the topology generated by the first device 110 and the topology generated by the fifth device 150.

As such, the initiator function can be transferred for the sake of the topology extension. According to the aforementioned embodiments, the initiator function can be transferred to one of the devices at the edges of the topology or one of the discovered devices not included in the topology. Further, according to other embodiment, the initiator function can be transferred to a device which is designated by the user of the preceding initiator. Particularly, the next initiator can be selected by the user as shown in FIG. 21.

Figure 21:
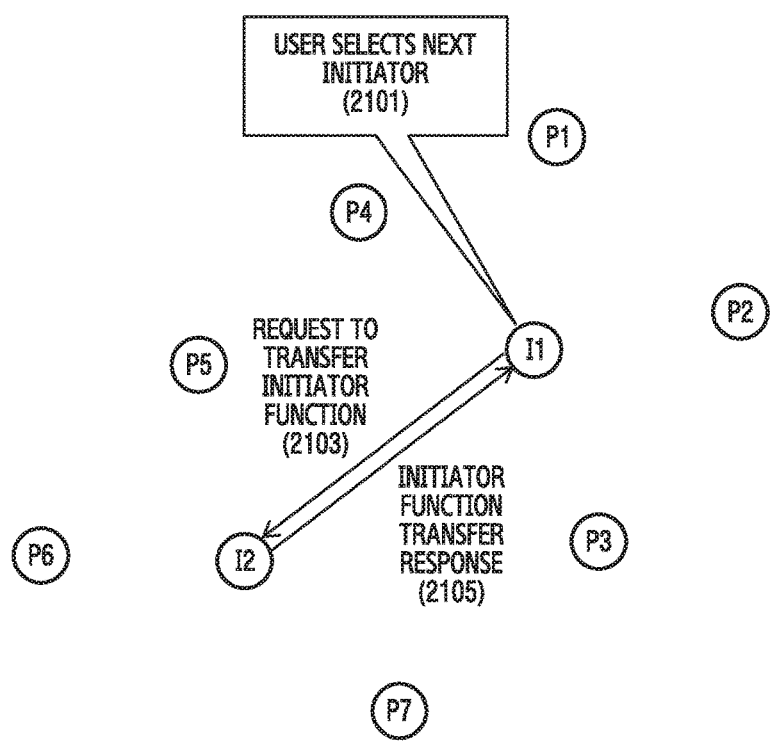
FIG. 21 illustrates initiator change by a user's selection according to an embodiment of the present disclosure.

FIG. 21 depicts initiator change by a user's selection according to an embodiment of the present disclosure. In FIG. 21, the preceding initiator is the device I1 and the next initiator is the device I2.

In operation 2101, the device I1 identifies the next identifier according to the user selection. That is, the user of the device I1 selects the next initiator. For doing so, the device I1 can display an interface for selecting the next initiator. For example, the device I1 can display a list of candidate devices of the next initiator, or display an input window for inputting identification information (e.g., phone number, device name, etc.) of the next initiator. Alternatively, the device I1 can provide an interface for selecting the next initiator in a device list (e.g., phone book) of other purpose.

In operation 2103, the device I1 sends a message for requesting the initiator function transfer. The device I1 can unicast the message to the device I2, or broadcast the message to discover the device I2. When the device I2 is already discovered, the device I1 can unicast the message. When the device I2 is not discovered, the device I1 can broadcast the message. For example, the message for requesting the initiator function transfer can be the message transmitted in the operation 2013 of FIG. 20.

In operation 2105, the device I2 transmits a message responding to the initiator function transfer. For doing so, the device I2 can display an interface asking the user whether to transfer the initiator function. When the user grants the transfer, the message notifies the transfer grant to the device I1. For example, the message responding to the initiator function transfer can be the message transmitted in the operation 2015 of FIG. 20.

The initiator change described in FIG. 21 can be realized in various scenarios. For example, when the device serving as the initiator wants to leave a corresponding area, the above-stated process can be conducted to maintain the topology information. Alternatively, the above-stated process can be conducted when the device serving as the initiator transfers its topology analyzing authority to other device. More specifically, at the scene of a disaster such as fire, earthquake, or flood, the process of FIG. 21 can be conducted when the initiator leaves the site or transfers its authority.

Another scenario for the initiator transfer can consider a target device specified. In this case, the initiator function can be transferred in response to movement of the target device. Specifically, a next initiator is selected according to the movement of the target device as shown in FIG. 22.

Figure 22:
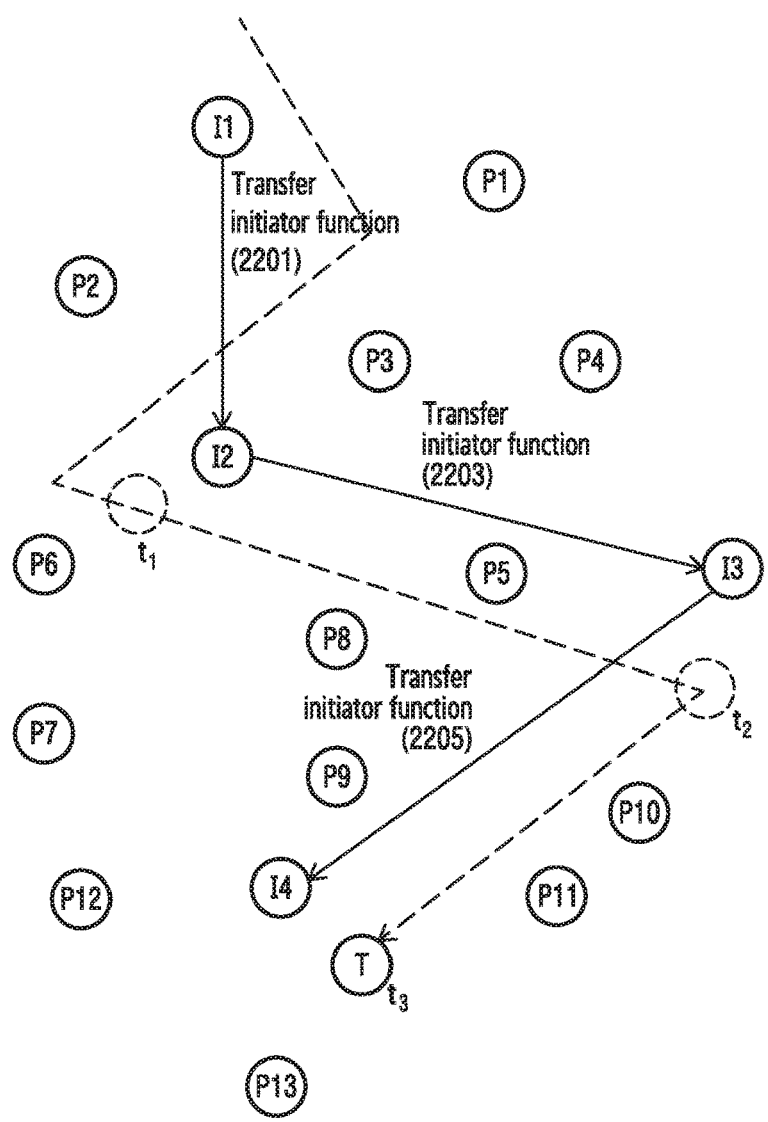
FIG. 22 illustrates initiator change in response to target device movement according to an embodiment of the present disclosure.

FIG. 22 depicts initiator change in response to target device movement according to an embodiment of the present disclosure. In FIG. 22, the target device is a device T, and an initiator function is transferred from a device I1 to a device I2, a device I3, and a device I4 in order. Referring to FIG. 22, an initial initiator function is performed by the device I1. At time $t_1$, the device I2 is the closest to the device T. Accordingly, the device I1 transfers the initiator function to the device I2 in operation 2201. At time $t_2$, the device I3 is the closest to the device T. Accordingly, the device I2 transfers the initiator function to the device I3 in operation 2203. At time $t_3$, the device I4 is the closest to the device T. Accordingly, the device I3 transfers the initiator function to the device I4 in operation 2205. Thus, the position of the device T can be tracked continuously.

Figure 23:
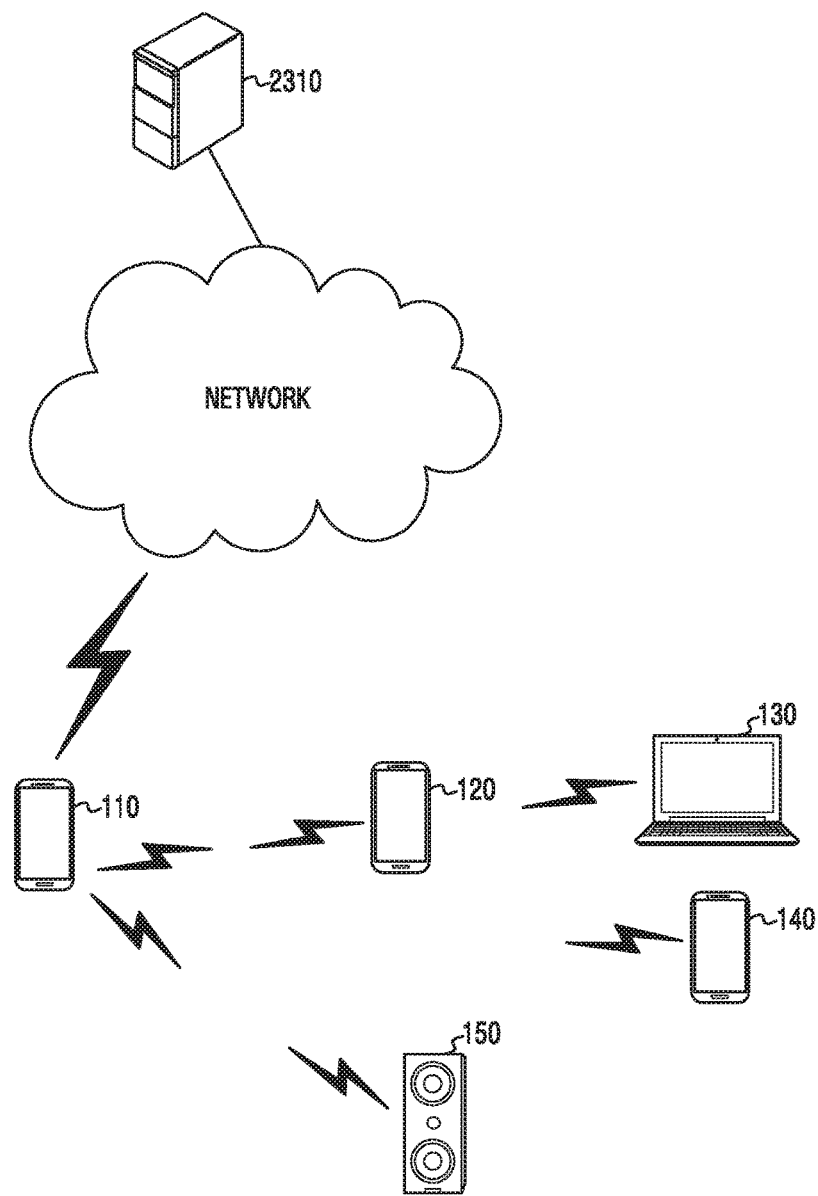
FIG. 23 illustrates a server and electronic devices according to an embodiment of the present disclosure.

As such, the positions of the devices can be determined according to various embodiments. In so doing, separate server assistance can be provided. FIG. 23 depicts an environment where the server assistance is feasible.

FIG. 23 depicts a server and electronic devices according to an embodiment of the present disclosure. Referring to FIG. 23, devices 110 through 150 travels within a certain range. The first device 110 can communicate with a server 2310 via a network connection. The server 2310 is a device for determining positions and combining topologies. The term 'electronic device' can embrace the server 2310. Herein, the network connection can include at least one base station, at least one gateway, and so on. According to another embodiment, the server 2310 can be also part of the network connection.

Positions of the devices 110 through 150 can be determined based on distance measurement. In so doing, multiple topologies can be combined. The topologies can be combined by one of the devices 110 through 150 or by the server 120. How one of the devices 110 through 150 combines the topologies is described in FIG. 24, and how the server 120 combines the topologies is described in FIG. 25.

Figure 24:
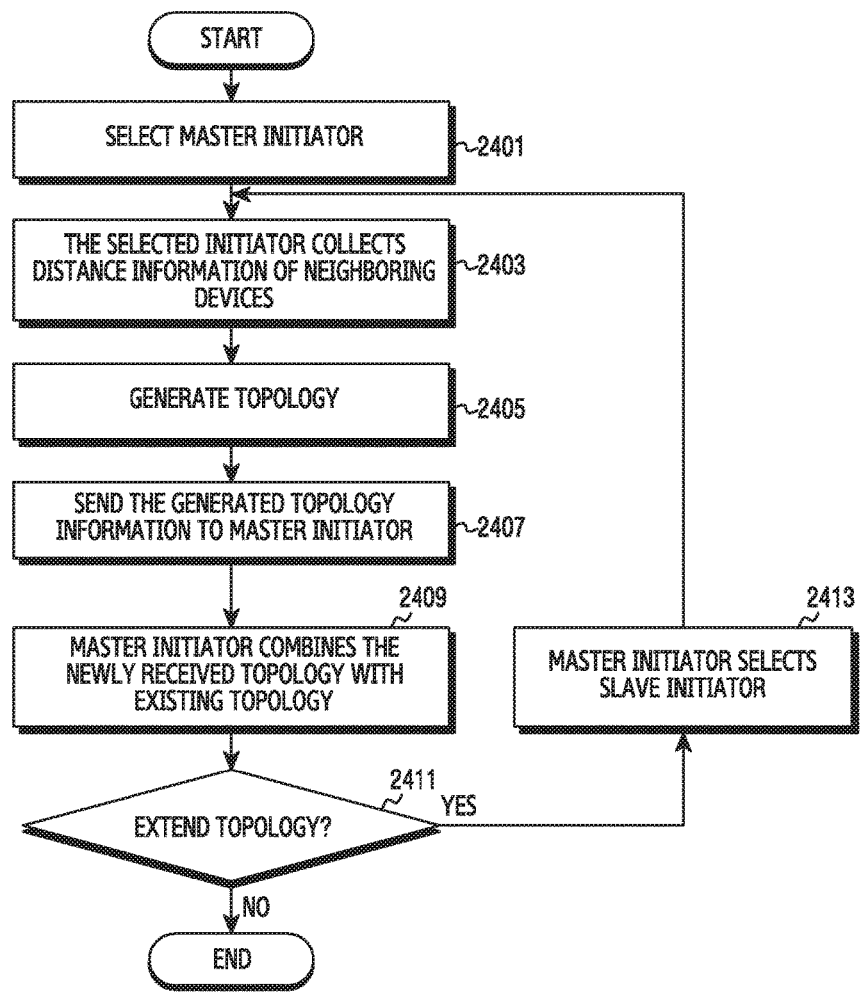
FIG. 24 illustrates a positioning method controlled by an electronic device according to an embodiment of the present disclosure.

FIG. 24 illustrates a positioning method controlled by an electronic device according to an embodiment of the present disclosure.

Referring to FIG. 24, in operation 2401, a master initiator is selected. The master initiator can be an initial initiator which initiates the positioning among multiple devices. In operation 2403, the selected initiator collects distance information of neighboring devices. Herein, the selected initiator can be the master initiator or a slave initiator. For doing so, the selected initiator can transmit radio signals and sound signals, detect signals from other devices, and collect detection results of the other devices. In operation 2405, the initiator generates a topology. That is, the selected initiator determines relative position relations of the devices.

In operation 2407, the generated topology information is transmitted to the master initiator. The operation 2407 is performed by the slave initiator, and can be omitted when the master initiator performs the operation 2405. In operation 2409, the master initiator combines the newly received topology with an existing topology. The operation 2409 is performed when the master initiator receives the topology information from the slave initiator, and can be omitted when the master initiator performs the operation 2405. In operation 2411, the master initiator determines whether to extend the topology. When determining to extend the topology, the master initiator selects the slave initiator in operation 2413. For example, the slave initiator can be selected based on the device positions on the topology, a distance from a target device, user's selection, discovery, cellular network connection, and a device type.

Figure 25:
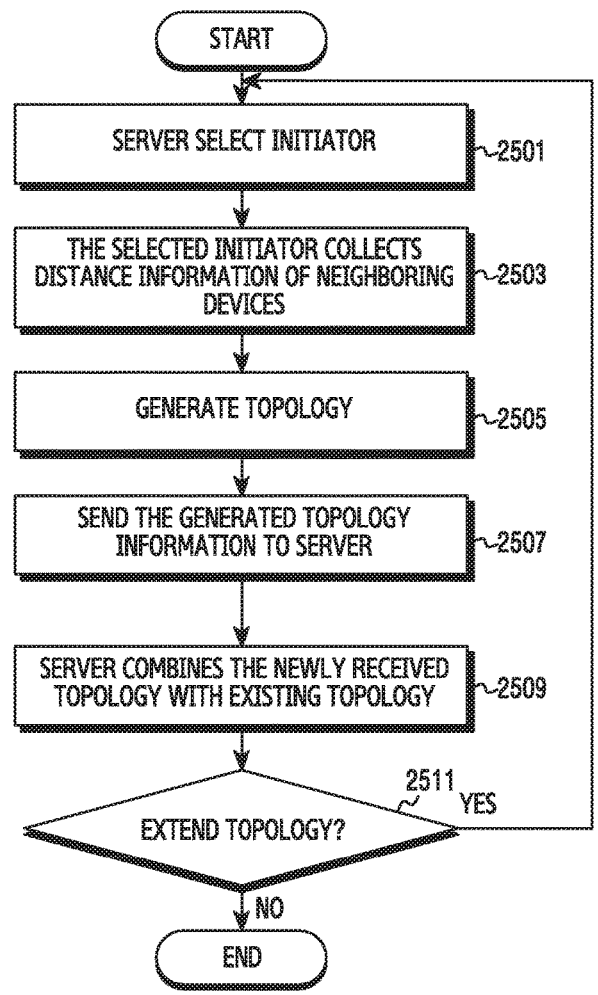
FIG. 25 illustrates a positioning method controlled by a server according to an embodiment of the present disclosure.

FIG. 25 illustrates a positioning method controlled by a server according to an embodiment of the present disclosure.

Referring to FIG. 25, in operation 2501, the server selects an initiator. For example, the server can receive a request for the initiator selection from a device, and select one of devices as the initiator based on a predefined criterion. The server can send a request for the position measurement to the selected initiator. In operation 2503, the selected initiator collects distance information of neighboring devices. For doing so, the initiator can transmit radio signals and sound signals, detect signals from other devices, and collect detection results of the other devices. In operation 2505, the initiator generates a topology. That is, the selected initiator determines relative position relations of the devices.

In operation 2507, the initiator transmits the generated topology information to the server. In operation 2509, the server combines the newly received topology with an existing topology. In operation 2511, the server determines whether to extend the topology. When determining to extend the topology, the server returns to operation 2501 and selects a next initiator. For example, the next initiator can be selected based on the device positions on the topology, a distance from a target device, user's selection, discovery, cellular network connection, and a device type.

FIGS. 26 through 31 depict positioning applications according to various embodiments of the present disclosure. FIGS. 26 through 31 depict various scenarios for the various embodiments.

Figure 26:
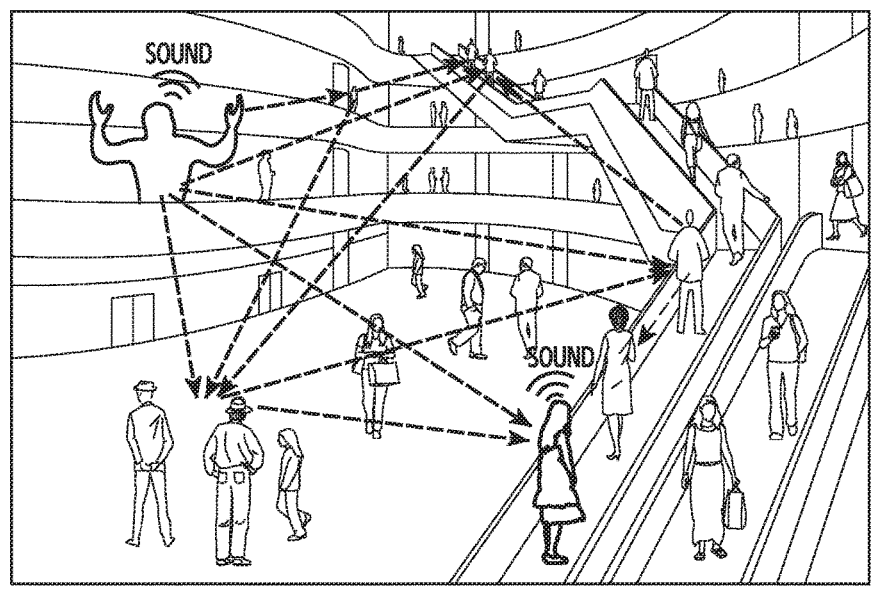
FIGS. 26 through 31 illustrate positioning applications according to various embodiments of the present disclosure.

FIG. 26 shows a missing child search scenario. A parent can lose his/her child and a phone is not available. In this situation, the parent executes a missing child search application on the electronic device. The missing child search application realizes a positioning algorithm according to the aforementioned embodiments. Accordingly, an electronic device of the parent becomes an initial initiator. The initial initiator can locate neighboring devices using sound signals. The initial initiator determines whether the located devices include a device of the missing child. That is, the initial initiator determines whether the generated topology covers the device of the missing child. When the neighboring devices do not include the device of the missing child, the neighboring devices each locate new neighboring devices using sound signals. That is, the other devices in the topology generated by the initial initiator perform the positioning algorithm as the new initiator. This process is repeated until the device of the missing child is located, and obtained position information of the device of the missing child is provided to the electronic device of the parent, that is, to the initial initiator.

Figure 27:
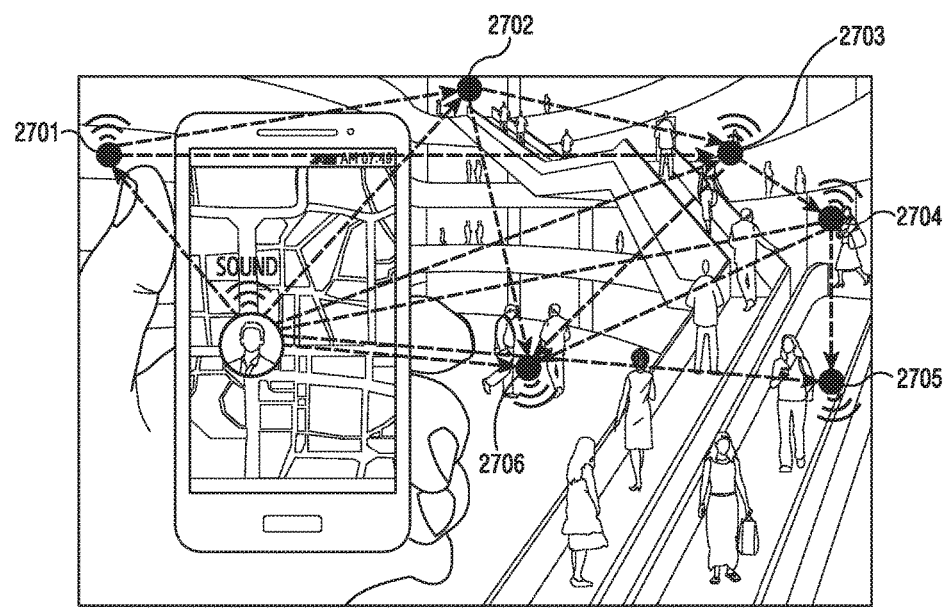

FIG. 27 shows a location search scenario. A user of an electronic device enters a building and then executes an indoor positioning application. The indoor positioning application realizes the positioning algorithm according to the aforementioned embodiments. The indoor positioning is fulfilled using anchors 2701 through 2706 installed inside the building. The anchors 2701 through 2706, which are wireless communication devices installed for advertisement and coupon provision, can repeatedly transmit preset information at fixed locations. A signal transmitted by the anchors 2701 through 2706 can be referred to as a beacon. The location of the electronic device in the building can be specified based on relative position information of the anchors 2701 through 2706. By executing the indoor positioning application, the electronic device obtains a topology using sound signals with the anchors 2701 through 2706 in the building. Next, the electronic device determines its current location using a reference location of the anchors 2701 through 2706. In addition, the electronic device can indicate the determined location to notify the location to the user.

Figure 28:
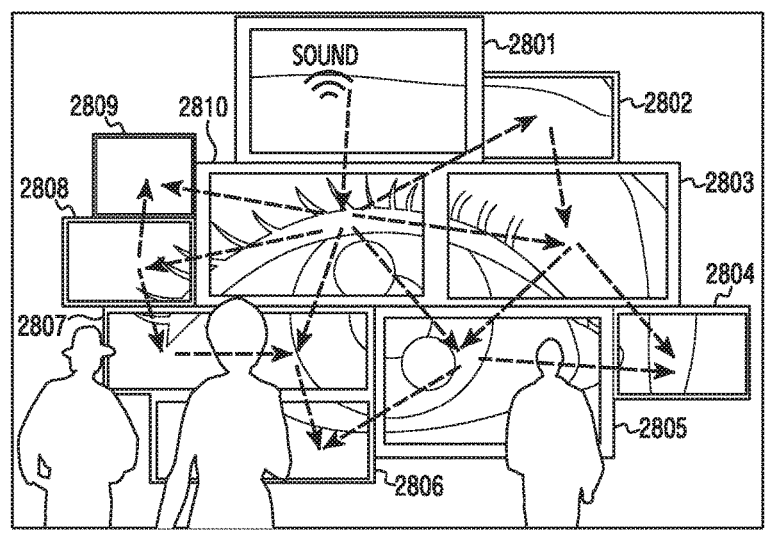

FIG. 28 shows a digital signage scenario. The digital signage indicates devices or a device for displaying information using digital displays. In FIG. 28, since a plurality of devices 2801 through 2810 displays one image and the images on the display devices 2801 through 2810 represent one single image, relative positions of the display devices 2801 through 2810 are required. In so doing, the present positioning technique according to the various embodiments can be adopted. When a user installs the display devices 2801 through 2810 in a desired space, the devices 2801 through 2810 obtain their topology using sound signals. Next, based on the topology, the display devices 2801 through 2810 can represent one single image without user's additional setting.

Further, when a display device is added, the present positioning technique can be applied. The user selects a display device to add to the existing digital signage. The display devices including the selected display device obtain their topology using sound signals. Based on the topology, the added display device can output a corresponding image without user's additional setting. That is, the display devices can partially output a new screen.

Figure 29:
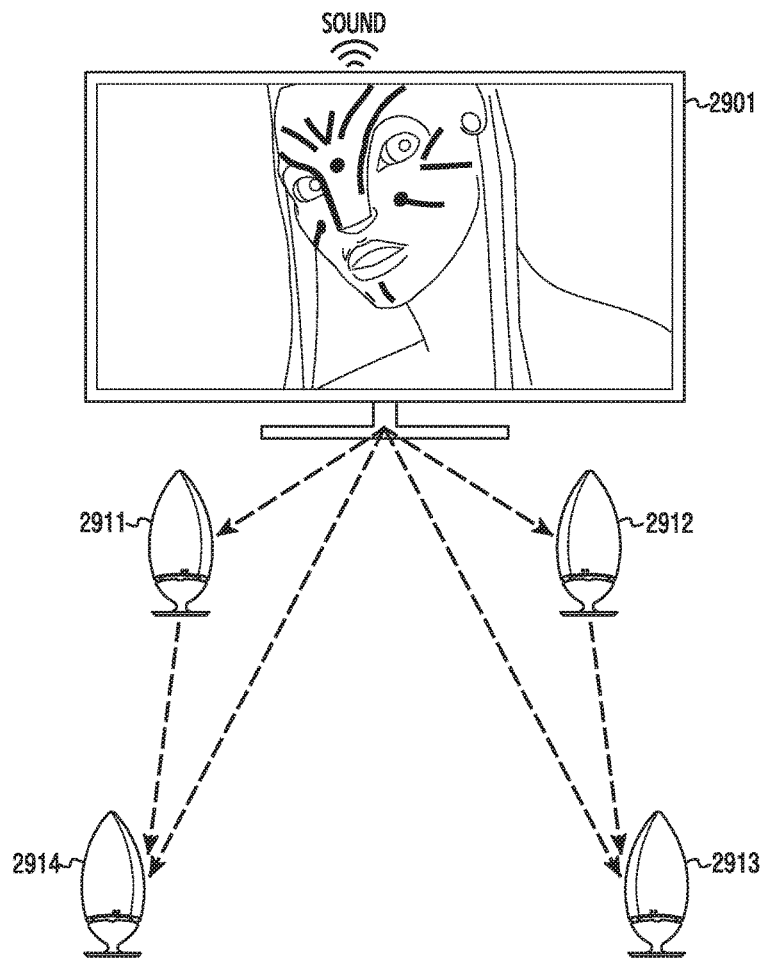

FIG. 29 shows a speaker auto setting scenario. A surround sound system can be deployed using a plurality of speakers. Appropriate channel allocation based on speaker locations is required. For doing so, the present positioning technique according to the various embodiments can be used. In FIG. 29, a user installs speakers 2911 through 2914 in front of a display device 2901. The display device 2901 and the speakers 2911 through 2914 obtain their topology using sound signals. Based on the obtained topology, the speakers 2911 through 2914 can allocate channels corresponding to their locations without user's additional setting. One of the display device 2901 and the speakers 2911 through 2914 serves as the initiator. Hence, the speakers 2911 through 2914 each can output the sound corresponding to their location.

Figure 30:
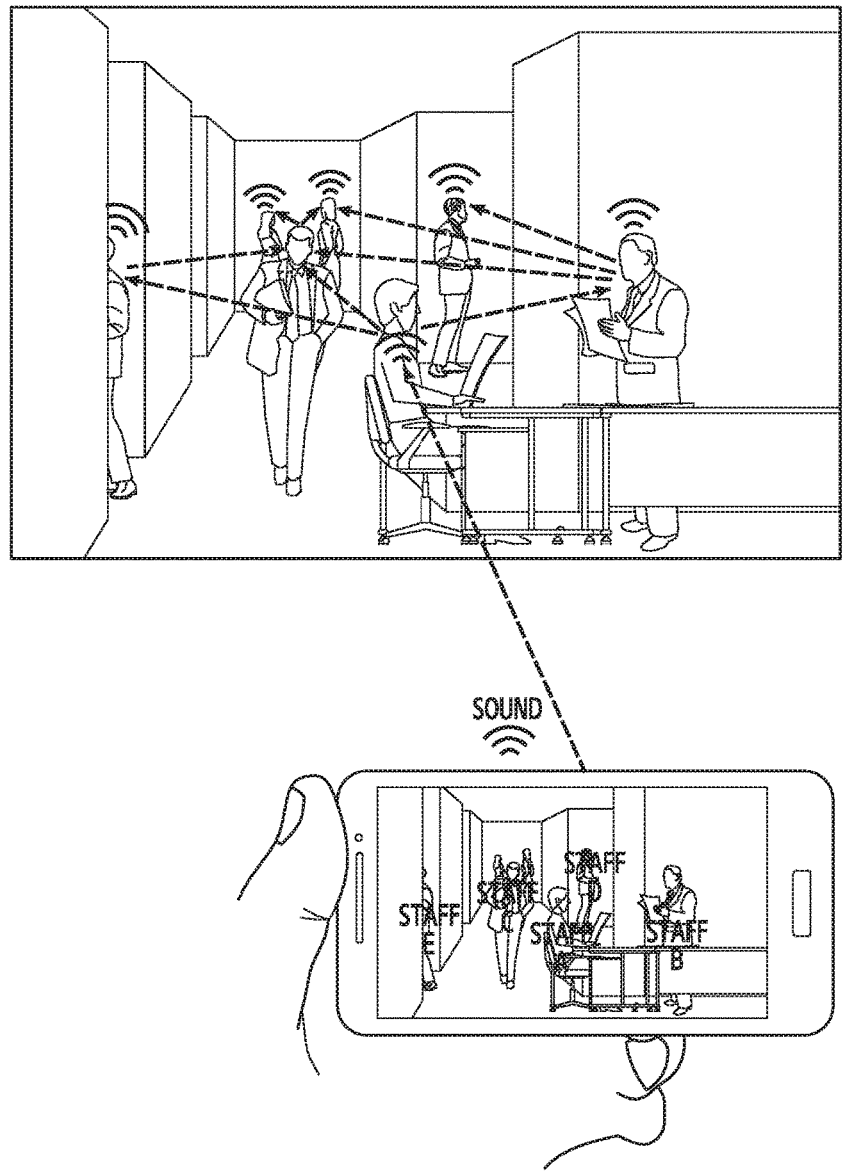

FIG. 30 shows a staff positioning scenario in an office. When a device serving as the initiator has user information of neighboring devices, it can locate the neighboring devices and thus determine positions of the users. In FIG. 30, the user enters the office and then executes a positioning application using his/her device. The positioning application realizes the positioning algorithm according to the embodiments. Hence, distances between devices of the staffs in the office can be measured using sound signals and the user device can calculate position arrangement of the staffs based on the measured distance information. Thus, the device can display the calculated position arrangement together with staff information.

Figure 31:
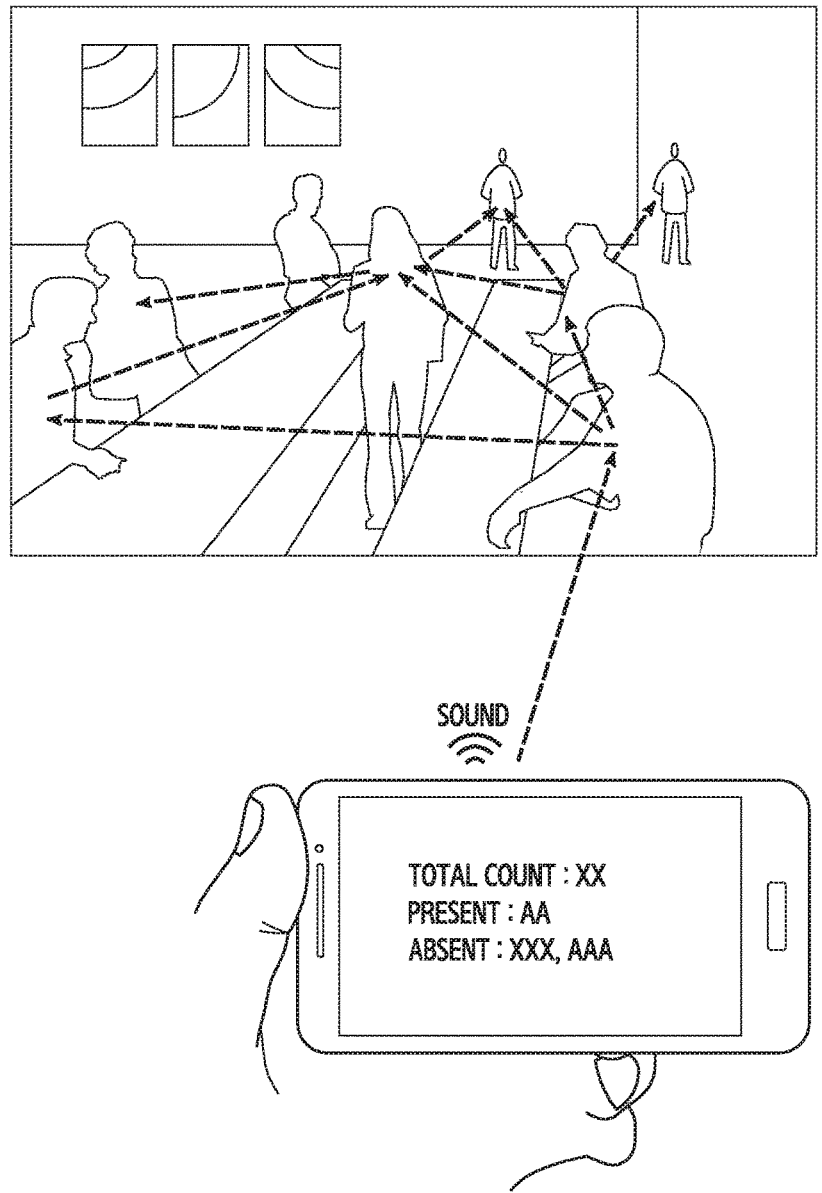

FIG. 31 shows an attendance check scenario. In FIG. 31, a user enters a classroom. Distances between devices of students in the classroom are measured using sound signals. Based on the measured distance information, position arrangement of the students can be calculated based on the user device. Thus, the user device can check attendance using the calculated position arrangement of the students and display attendance information.

The methods described in the claims or the specification of the present disclosure can be implemented using hardware and software alone or in combination.

Any such software may be stored in a computer readable storage medium. The computer readable storage medium stores one or more programs (software modules) including instructions, which when executed by at least one processor in a UE, cause the UE to perform a method of the present disclosure.

Any such software may be stored in the form of volatile or non-volatile storage such as Read Only Memory (ROM), or in the form of memory such as Random Access Memory (RAM), memory chips, device, or integrated circuits, or on an optically or magnetically readable medium such as a Compact Disc (CD)-ROM, Digital Versatile Disc (DVD), magnetic disk or magnetic tape or the like.

It will be appreciated that the storage devices and storage media are embodiments of machine-readable storage that are suitable for storing a program or programs comprising instructions that, when executed, implement embodiments of the present disclosure. Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

As set forth above, the electronic device can obtain the position relations between the devices.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating an electronic device, comprising:

transmitting, to a plurality of devices, control information comprising a transmission time for each of the plurality of devices to transmit a signal for a distance measurement, and a number of the plurality of devices for the distance measurement;

receiving, from each of the plurality of devices, feedback information comprising reception times of signals each of which is transmitted from another device in the transmission time, wherein a number of the reception times corresponds to the number of the plurality of devices identified by the control information;

determining a distance between each pair of the plurality of devices based on the transmission time and each of the reception times identified by the feedback information; and determining positions of the plurality of devices based on the distance between each pair of the plurality of devices.

2. The method of claim 1, wherein the positions comprise coordinates for the plurality of devices in a coordinate system where the electronic device is positioned at an origin of the coordinate system, and wherein the coordinates are determined based on the distance.

3. The method of claim 1, wherein the control information further comprises at least one of a signal pattern for the distance measurement, or identification information of the plurality of devices.

4. The method of claim 1, further comprising:
transmitting, to each of the plurality of devices, information indicating the positions of the plurality of devices.

5. The method of claim 1, further comprising:
transmitting, to at least one device, a message for requesting to determine positions of other devices associated with the at least one device.

6. The method of claim 5, further comprising:
receiving, from the at least one device, information indicating the positions determined by the at least one other device.

7. An electronic device comprising:
a transceiver; and
at least one processor, operably coupled to the transceiver, configured to control the transceiver,
wherein the transceiver is configured to:
transmit, to a plurality of devices, control information comprising a transmission time for each of the plurality of devices to transmit a signal for a distance measurement, and a number of the plurality of devices for the distance measurement, and
receive, from each of the plurality of devices, feedback information comprising reception times of signals each of which is transmitted from another device in the transmission time, wherein a number of the reception times corresponds to the number of the plurality of devices identified by the control information, and
wherein the at least one processor is further configured to:
determine a distance between each pair of the plurality of devices based on the transmission time and each of the reception times identified by the feedback information; and
determine positions of the plurality of devices based on the distance between each pair of the plurality of devices.

8. The electronic device of claim 7, wherein the positions comprise coordinates for the plurality of devices in a coordinate system where the electronic device is positioned at an origin of the coordinate system, and wherein the coordinates are determined based on the distance.

9. The electronic device of claim 7, wherein the control information further comprises at least one of a signal pattern for the distance measurement, or identification information of the plurality of devices.

10. The electronic device of claim 7, wherein the transceiver is further configured to transmit, to each of the plurality of devices, information indicating the positions of the plurality of devices.

11. The electronic device of claim 7, wherein the transceiver is further configured to transmit, to at least one device, a message for requesting to determine positions of other devices associated with the at least one device.

12. The electronic device of claim 11, wherein the transceiver is further configured to receive, from the at least one device, information indicating the positions determined by the at least one other device.

13. The electronic device of claim 7, wherein the determined positions are used to control a display setting or a speaker setting.

14. An electronic device comprising:
a transceiver; and
at least one processor, operably coupled to the transceiver, configured to control the transceiver, wherein the transceiver is configured to:
receive, from a first device, control information comprising a transmission time for each of a plurality of devices to transmit a signal for a distance measurement, and a number of the plurality of devices for the distance measurement,
receive signals each or which is transmitted
from another device
in the transmission time, and
transmit, to the first device, feedback information comprising reception times of the signals, wherein a number of the reception times corresponds to the number of the plurality of devices identified by the control information,
wherein a distance between each pair of the plurality of devices is determined based on the transmission time and each of the reception times identified by the feedback information, and
wherein positions of the plurality of devices are determined based on the distance between each pair of the plurality of devices.

15. The electronic device of claim 14, wherein the positions comprise coordinates for the plurality of devices in a coordinate system where the electronic device is positioned at an origin of the coordinate system, and wherein the coordinates are determined based on the distance.

16. The electronic device of claim 14, wherein the control information further comprises at least one of a signal pattern for the distance measurement, or identification information of the plurality of devices.

17. The electronic device of claim 14, wherein the transceiver is further configured to receive, from the first device, information indicating the positions of the plurality of devices.

18. The electronic device of claim 14, wherein the transceiver is further configured to receive, from the first device, a message for requesting to determine positions of other devices associated with the electronic device.

19. The electronic device of claim 18, wherein the processor is further configured to determine the positions of the other devices, and wherein the transceiver is further configured to transmit, to the first device, information indicating the positions of the other devices.

20. The electronic device of claim 14, wherein the determined positions are used to control a display setting or a speaker setting.

* * * * *